(12) United States Patent
Yokoyama

(10) Patent No.: US 7,684,527 B2
(45) Date of Patent: Mar. 23, 2010

(54) COMMUNICATION DEVICE AND COMMUNICATION METHOD

(75) Inventor: Hitoshi Yokoyama, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/898,712

(22) Filed: Sep. 14, 2007

(65) Prior Publication Data

US 2008/0008276 A1 Jan. 10, 2008

Related U.S. Application Data

(63) Continuation of application No. PCT/JP2005/004570, filed on Mar. 15, 2005.

(51) Int. Cl.
*H04L 1/02* (2006.01)

(52) U.S. Cl. ........................ 375/347; 375/316; 375/267; 375/358; 455/101

(58) Field of Classification Search ................. 375/316, 375/295, 267, 347, 358, 142; 455/101
See application file for complete search history.

(56) References Cited

U.S. PATENT DOCUMENTS

| | | | | |
|---|---|---|---|---|
| 6,070,079 | A * | 5/2000 | Kuwahara | 455/456.2 |
| 6,778,612 | B1 * | 8/2004 | Lozano et al. | 375/299 |
| 6,834,043 | B1 * | 12/2004 | Vook et al. | 370/310 |
| 6,859,487 | B1 | 2/2005 | Imura | |
| 6,859,503 | B2 * | 2/2005 | Pautler et al. | 375/299 |
| 7,058,363 | B2 * | 6/2006 | Hottinen et al. | 455/69 |
| 7,065,144 | B2 * | 6/2006 | Walton et al. | 375/260 |
| 7,103,326 | B2 * | 9/2006 | Wu et al. | 455/101 |
| 7,123,887 | B2 * | 10/2006 | Kim et al. | 455/103 |
| 7,133,459 | B2 * | 11/2006 | Onggosanusi et al. | 375/267 |
| 7,184,713 | B2 * | 2/2007 | Kadous et al. | 455/67.13 |
| 7,197,082 | B2 * | 3/2007 | Alexiou et al. | 375/260 |
| 7,200,368 | B1 * | 4/2007 | Hottinen et al. | 455/101 |
| 7,236,537 | B2 * | 6/2007 | Hottinen et al. | 375/267 |
| 7,242,724 | B2 * | 7/2007 | Alexiou et al. | 375/267 |

(Continued)

FOREIGN PATENT DOCUMENTS

JP 03-135233 A 6/1991

(Continued)

OTHER PUBLICATIONS

S. M. Alamouti, "A Simple Transmit Diversity Technique for Wireless Communications," *IEEE Journal on Select Areas in Communications*, vol. 16, No. 8, pp. 1451-1458, Oct. 1998.

(Continued)

*Primary Examiner*—Temesghen Ghebretinsae
(74) *Attorney, Agent, or Firm*—Myers Wolin, LLC

(57) ABSTRACT

There is provided a radio communication device having a high quality and accuracy regardless of fluctuation degree of the transmission path characteristic. The radio communication device estimates the fluctuation speed of the transmission path characteristic from the time correlation of the reception signal, judges the diversity technique used between the communication devices from the estimated value, and feeds back the judgment information so as to switch the diversity between the communication devices, thereby increasing the diversity gain. The feedback information is minimized by defining a correspondence table. Moreover, diversity switching is performed at a timing considering a control delay and a propagation path delay so as to prevent an instantaneous disconnection of the communication.

20 Claims, 26 Drawing Sheets

U.S. PATENT DOCUMENTS

| | | | |
|---|---|---|---|
| 7,248,638 B1* | 7/2007 | Banister | 375/267 |
| 7,248,645 B2* | 7/2007 | Vialle et al. | 375/299 |
| 7,359,470 B2* | 4/2008 | Molisch et al. | 375/358 |
| 7,406,055 B2* | 7/2008 | Taira et al. | 370/310 |
| 2001/0033622 A1* | 10/2001 | Jongren et al. | 375/267 |
| 2002/0012380 A1* | 1/2002 | Hottinen et al. | 375/130 |
| 2002/0123371 A1 | 9/2002 | Miyoshi et al. | |
| 2003/0012318 A1* | 1/2003 | Piirainen | 375/358 |
| 2003/0086371 A1* | 5/2003 | Walton et al. | 370/235 |
| 2004/0120411 A1* | 6/2004 | Walton et al. | 375/260 |
| 2005/0047515 A1* | 3/2005 | Walton et al. | 375/267 |
| 2005/0048933 A1* | 3/2005 | Wu et al. | 455/101 |
| 2005/0078762 A1* | 4/2005 | Ketchum et al. | 375/267 |
| 2005/0117520 A1 | 6/2005 | Miyoshi | |
| 2005/0129137 A1* | 6/2005 | Yamada et al. | 375/267 |
| 2005/0190853 A1* | 9/2005 | Tirkkonen | 375/295 |
| 2005/0260954 A1* | 11/2005 | Hamalainen et al. | 455/101 |
| 2005/0281361 A1* | 12/2005 | Kim | 375/347 |
| 2006/0008021 A1* | 1/2006 | Bonnet | 375/267 |
| 2006/0018402 A1* | 1/2006 | Mehta et al. | 375/299 |
| 2006/0056533 A1* | 3/2006 | Molisch et al. | 375/267 |
| 2006/0133544 A1* | 6/2006 | Kawada et al. | 375/343 |
| 2006/0154608 A1* | 7/2006 | Fukuoka et al. | 455/67.13 |
| 2007/0115801 A1* | 5/2007 | Li et al. | 370/208 |
| 2007/0177681 A1* | 8/2007 | Choi et al. | 375/260 |

FOREIGN PATENT DOCUMENTS

| | | |
|---|---|---|
| JP | 2000-252893 A | 9/2000 |
| JP | 2000-269929 A | 9/2000 |
| JP | 2001-358621 A | 12/2001 |
| JP | 2002-16534 A | 1/2002 |
| JP | 2003-332954 A | 11/2003 |
| JP | 2003-347980 A | 12/2003 |
| JP | 2004-112098 A | 4/2004 |

OTHER PUBLICATIONS

V. Tarokh, et al., "Space-Time Block Codes from Orthogonal Designs," *IEEE Transactions on Information Theory*, vol. 45, No. 5, pp. 1456-1467, Jul. 1999.

H. Jafarkhani, "A Quasi-Orthogonal Space-Time Block Code," *IEEE Transactions on Communications*, vol. 49, No. 1, Jan. 2001.

A. Morimoto, et al., "Field Experiments on Autocorrelation Characteristics of Shadowing for OFCDM Broadband Wireless Access in Forward Link," *Processings of the 2004 IEICE General Conference*, B-5-90, Mar. 2004.

M. Gudmundson, "Correlation Model for Shadow Fading in Mobile Radio Systems," Electronics Letters, *IEEE*, vol. 27, No. 23, pp. 2145-2146, Nov. 1991.

* cited by examiner

TRANSMITTING STATION    RECEIVING STATION

FIG. 19

| METHOD | CODE ORTHOGONALITY | DIVERSITY DIMENSION | FEEDBACK (*) | EFFECT (AT FAST TIME OF fd) |
|---|---|---|---|---|
| TIME DIVERSITY | × | ◎ | TRANSMISSION TIMING | +0.2 db AND SEVERAL +10 db WHEN SPATIAL CORRELATION INSTANTANEOUSLY BECOMES 1 |
| STBC (TRANSMISSION: 2 ANTENNAS) | ◎ | △ | NONE | 0 db (STANDARD IN CONVENTIONAL TYPE) |
| STBC (TRANSMISSION: 3 OR MORE ANTENNAS) | ○ | ○ | SELECTION OF CODE SEQUENCE | −0.3 db (CODE ORTHOGONALITY LOST) |

◎ EXTREMELY GOOD ○：GOOD △：COMPARATIVELY GOOD ×：POOR
(*) NECESSARY INFORMATION OTHER THAN TIME DIVERSITY OR STBC METHOD DETERMINING BIT

FIG. 20

| BIT SEQUENCE | DEFINITION | BIT SEQUENCE | DEFINITION |
|---|---|---|---|
| 000 | STBC MODE SEQUENCE 1 | 100 | TIME DIVERSITY DELAY 0.3 ms |
| 001 | STBC MODE SEQUENCE 2 | 101 | TIME DIVERSITY DELAY 0.4 ms |
| 010 | TIME DIVERSITY DELAY 0.1 ms | 110 | TIME DIVERSITY DELAY 0.5 ms |
| 011 | TIME DIVERSITY DELAY 0.2 ms | 111 | TRANSMIT 3 TIMES AT 0.1 ms DELAY INTERVAL |

FIG. 21

| RETRANSMISSION DATA | DIVERSITY MODE | MIMO MODE |
|---|---|---|
| TRANSMISSION DIVERSITY | ON | OFF |
| ARQ | OFF | ON |

FIG. 22

| METHOD | CODE ORTHOGONALITY | DIVERSITY DIMENSION | FEEDBACK (*) | APPLIED AREA DEPENDING ON MAGNITUDE OF $\tau$ | CHARACTERISTICS (ABOUT STBC) |
|---|---|---|---|---|---|
| TIME DIVERSITY | × | ◎ | TRANSMISSION TIMING | SHORTER THAN ARQ CYCLE | PREVENTION OF SHORT BREAK LEADING TO SPATIAL CORRELATION 1 IMPROVEMENT OF DIVERSITY BY TRANSMITTING PLURAL TIMES |
| STBC (TRANSMISSION: 2 ANTENNAS) | ◎ | △ | NONE | PROPORTIONAL TO THE NUMBER OF ANTENNAS | — |
| STBC (TRANSMISSION: 3 OR MORE ANTENNAS) | ◎ | ○ | SELECTION OF CODE SEQUENCE | PROPORTIONAL TO TWICE THE NUMBER OF ANTENNAS | THROUGHPUT CHARACTERISTIC(x), IMPROVEMENT OF DIVERSITY IN PROPORTION TO ANTENNAS |
| STBC (TRANSMISSION: 3 OR MORE ANTENNAS) | ○ | ○ |  | PROPORTIONAL TO THE NUMBER OF ANTENNAS | IMPROVEMENT OF DIVERSITY IN PROPORTION TO ANTENNAS KEEPING SUBSTANTIAL ORTHOGONALITY |

FIG. 24

| CONTROL METHOD | CHARACTERISTICS |
|---|---|
| ERROR CORRECTION CODING | SLIGHT QUANTITY OF ARITHMETIC OPERATION IS NEEDED FOR DECODING OF ERROR CORRECTION (△) CODING GAIN IS EXTREMELY LARGE (◎) FEEDBACK QUANTITY IS REDUNDANT (△) |
| TRANSMIT SAME SYMBOL PLURAL TIMES; DETERMINATION OF BIT LIKELIHOOD | DETERMINATION METHOD IS SMALL OF QUANTITY OF ARITHMETIC OPERATION (◎) LIKELIHOOD DETERMINATION GAIN IS LARGE (○) FEEDBACK QUANTITY IS REDUNDANT WITH SAME GAIN AS BY ERROR CORRECTION CODING (×) |
| INCREASE TRANSMISSION POWER | FEEDBACK QUANTITY HAS NO REDUNDANCY (◎) INCREASE IN INTERFERENCE OF FEEDBACK LINK (×) |

COMMUNICATION DEVICE AND COMMUNICATION METHOD

CROSS-REFERENCE TO RELATED APPLICATION

This is a continuation of Application PCT/JP2005/004570, filed on Mar. 15, 2005, now pending, the contents of which are herein wholly incorporated by reference.

BACKGROUND OF THE INVENTION

1. Field of the Invention

The present invention relates to a wireless transmitting device and a wireless transmitting method.

2. Description of the Related Art

A short-break-free wireless communication technology applicable to voice speeches, radios, low-pixel television broadcasting, etc has been examined over the recent years. The technology under the examination is the wireless communication technology with no time delay larger than a predetermined limit value. Obstacles against realizing the short-break-free wireless communications are interference between radio signals received via different propagation routes and screening on the propagation path. These phenomena are called fading and shadowing. A wireless communication method and a wireless communication device, which are effective in reducing these phenomena, are required for actualizing the short-break-free wireless communications.

What is focused as a technology having a possibility thereof is a communication technology based on space time block coding (STBC) for obtaining diversity by transmitting encoded data from a plurality of antennas on a transmitting side and a communication technology to which time diversity is applied.

The STBC is a technology for obtaining spatial diversity by transmitting signals from transmitting antennas spatially away from each other on the occasion of sending the same data by use of a plurality of transmitting antennas.

By contrast with the STBC, a time diversity method is a technology for obtaining time diversity and enhancing a quality of the wireless communications by transmitting signals distanced in time a plural number of times.

On the other hand, in recent years, a technology enabling large-capacity data communications as of images etc has been examined. The prior art is a communication technology based on a MISO (Multiple-Input Single-Output) architecture defined as a technology of receiving communication signals transmitted from the plurality of transmitting antennas by a single receiving antenna. However, a communication technology based a MIMO (Multiple-Input Multiple-Output) architecture defined as a technology of receiving the communication signals transmitted from the plurality of transmitting antennas by a plurality of receiving antennas, is examined for enabling the larger-capacity data communications.

FIG. 1 shows an example of a wireless terminal device based on the MISO architecture. A transmitting station has a plurality of transmitting antennas, while a receiving station has a single receiving antenna. In FIG. 1, the MISO architecture is exemplified by assuming Wideband Code Division Multiple Access (W-CDMA).

FIG. 2 shows an example of a wireless terminal device based on the MIMO architecture. The transmitting station has the plurality of transmitting antennas, and the receiving station also has the plurality of receiving antennas. In FIG. 2, the MIMO architecture is exemplified by assuming Beyond 3G (Beyond Third Generation (3G) Mobile Communication System).

FIG. 3 illustrates examples of communication procedures applicable to the MIMO architecture communication system, wherein the communication procedures are categorized into data transmission conducted a plural number of times and diversity transmission. In the case of the communications based on the MIMO architecture, the multi-transmission technology is exemplified by BLAST (Bell Labs Layered Space-Time), E-SDM (Eigen-Space division Multiplexing), etc. On the other hand, in the communications base on the MIMO architecture, the diversity transmission technology is exemplified by the STBC and the time diversity method.

In these technologies, the diversity transmission is a communication procedure suited to the short-break-free wireless communications.

[Patent document 1] Japanese Patent Application Laid-Open Publication No. 2000-269929

[Non-Patent document 1] "A Simple transmit diversity technique for wireless communications" authored by Siavash M. Alamouti, IEEE Jour Sel. Areas in Com, U.S.A., IEEE, October in 1998, vol. 16, no. 8, pp. 1451-1458.

[Non-Patent document 2] "Space-Time Block Codes from Orthogonal Designs", authored by V. Tarokh et al., IEEE Trans on Info Theory, U.S.A., IEEE, June in 1999, Vol. 45, no. 5.

[Non-Patent document 3] "A quasi orthogonal space-time block code", authored by H. Jafarkhani, IEEE Trans. Comm., U.S.A., IEEE, April in 2003, vol. 49, pp. 287-291.

[Non-Patent document 4] "Results of Outdoor Experiments for Auto-Correlativity of Shadowing Using Downlink OFDM Broadband Wireless Access", authored by Morimoto, et al., Proceedings at the 2004 General Meeting of the Institute of Electronics, Information and Communication Engineers, in the year of 2004, B-5-90.

[Non-Patent document 5] "Correlation Model for Shadow Fading in Mobile Radio Systems", authored by M. Gudmundson, Electronics Letters, U.K., IEEE, 1991, Vol. 27, no. 23, pp. 2145-2146.

SUMMARY OF THE INVENTION

In the transmission diversity, the STBC has a high spatial correlation depending on a location of the terminal, resulting a possibility of being unable to acquire the diversity. Further, the STBC has a case in which a time correlation of a received signal or a frequency correlation of the received signal declines due to fading caused by fluctuations on a propagation path. In such a case, code orthogonality is not maintained, and the interference between the antennas rises, resulting in a possibility that the performance decreases.

On the other hand, as for the time diversity, it takes a considerable period of time up to such timing as to decrease the time correlation between the received signals when the fading fluctuations are slow. Then, when a delay up to that time becomes substantially the same as a normal delay caused by retransmission, the time diversity has fewer advantages.

It is therefore difficult to determine which is a superior wireless communication procedure, the STBC or the transmission diversity method, if there are the propagation path fluctuations and influence by a screening object between the wireless communication terminal device and the wireless communication base station.

The present invention is devised in view of such a point and aims at providing a wireless communication device and a wireless communication method that realize a high communication quality without any short break in the wireless communications under the propagation path fluctuations and under the influence by the screening object between the wireless communication terminal device and the wireless communication base station.

In addition, the present invention aims at providing a technology that can be carried out for a communication device based on the MIMO architecture as well as for a communication device based on the MISO architecture.

Means for Solving the Problems

The present invention adopts the following procedures in order to solve the problems.

(1) Namely, the present invention is a wireless communication device comprising: receiving means receiving radio signals from a partner communication device; means stored with the received signals received for a predetermined period; means calculating a time correlation defined as a correlation between the received signal received from a first reference point of time onward within the predetermined period and the received signal received from a second reference point of time onward within the predetermined period; means obtaining a time difference between the first reference point of time and a second reference point of time when the time correlation takes a value of a predetermined range; selecting means selecting a wireless communication procedure designated corresponding to the time difference; and instructing means instructing the partner communication device about the selected wireless communication procedure.

According to this configuration, the wireless communication device receives the radio signals from the partner communication device, and stores the received signals within a preset period of predetermined time. Then, the present wireless communication device detects the time correlation on the basis of the two reference points of time with respect to the time, and can search for a characteristic about a time change of the radio signal on the basis of the value of the time correlation. Then, the wireless communication procedure can be selected based on the value of the time correlation. Further, it is possible to instruct the partner wireless communication device about the selected wireless communication procedure.

(2) Further, the wireless communication device may further comprise means calculating the time correlation with one received signal in the plurality of radio signals received from the partner communication device.

According to this configuration, the wireless communication device can calculate the time correlation of the received signals by use of one received signal in the received signals from the plurality of antennas.

(3) Further, the wireless communication device may further comprise: means calculating a plurality of time correlations from the plurality of radio signals received from the partner communication device; and means generating a combined time correlation weighted with a magnitude of a value of electric power of each of the plural received signals, from the plurality of time correlations and the plurality of received signals.

According to this configuration, the wireless communication device calculates the plurality of time correlations by employing the plurality of received signals in the received signals from the plurality of transmitting antennas, and calculates the combined time correlation weighted with the magnitude of the value of the electric power from each of the plurality of transmitting antennas, whereby the time correlation can be calculated in a way that improves a gain of the received signal by so-called maximum ratio combining.

(4) Moreover, the wireless communication device may further comprise means calculating the time correlation with respect to a combination of the plural received signals from the plurality of radio signals received from said partner communication device.

According to this configuration, the wireless communication device calculates the time correlation with respect to such a combination as to select the two signals from the received signals from the plurality of transmitting antennas, and hence a gain of the diversity taking account of positions of the transmitting antennas is obtained.

(5) Moreover, the wireless communication device may further comprise means determining whether or not a communication procedure selected by the selecting means is the same as a communication procedure used before the selection, wherein the instructing means includes means, if the pre-selection communication procedure is the same as the post-selection communication procedure, instructing the partner communication device about none of the selected communication procedure.

According to this configuration, when the wireless communication device selects the communication procedure, if the communication means employed so far is the same as the post-selection communication means as a result of comparing these communication means with each other, a load caused by the signal processing between the wireless communication device and the partner communication device can be restrained by instructing the partner communication device about none of the communication means as the feedback information.

(6) The wireless communication device may further comprise: means measuring a predetermined period of stopping time when selecting the communication procedure; means stopping the calculation of the time correlation during the period of stopping time; and means resuming the process of calculating the time correlation after the period of stopping time.

The wireless communication device can restrain the load on the device, which is caused by the wireless communication device's calculating the time correlation, by calculating none of the time correlation during the predetermined period of time after selecting the communication procedure.

(7) Further, the wireless communication device may further comprise changeover control means changing over a receiving procedure in the receiving means to the selected wireless communication procedure after an elapse of a predetermined period of time since the wireless communication procedure has been selected.

The wireless communication device can change over the communication procedure by synchronizing the timing with the partner communication device in a way that changes over the communication procedure after waiting for the changeover of the communication procedure for the predetermined period.

(8) Further, the means instructing the partner communication device about the selected wireless communication procedure can give the instruction in a way that associates the selected wireless communication procedure with a bit sequence to be fed back.

The wireless communication device associates the selected communication procedure with the bit sequence and can therefore notify of the selected communication procedure with a minimum quantity of information required.

(9) A communication device comprises: means receiving an instruction of changing over a communication procedure from a partner communication device; and means changing over the communication procedure to the selected wireless communication procedure after an elapse of a predetermined period.

The wireless communication device changes over the wireless communication procedure after an elapse of the predetermined time upon receiving the changeover instruction of the wireless communication means, and is therefore capable of changing over the communication procedure by synchronizing the timing of the wireless communication procedure with the partner communication device.

The present invention may also be a communication method executed by the communication device described above.

Effects of the Invention

According to the present invention, it is possible to perform the wireless communications between the wireless communication devices in such a way that the transmitting side wireless communication device and the receiving side wireless communication device select the wireless communication procedure suitable for the propagation path in accordance with a degree of the fluctuations on the wireless propagation path. Further, the preferable communications can be performed between the wireless communication devices even when the propagation path is screened.

BRIEF DESCRIPTION OF THE DRAWINGS

FIG. 19 is an explanatory diagram showing a range of a transmission diversity effect.

FIG. 20 is a diagram showing an example of an operation corresponding to feedback bits.

FIG. 21 is an explanatory diagram showing how traffic of feedback information is restrained.

FIG. 22 is an explanatory diagram showing a relation between timing when the time correlation disappears and the transmission diversity suited to this timing.

FIG. 24 is an explanatory diagram showing a transmission control method of the feedback information bits.

DETAILED DESCRIPTION OF THE INVENTION

A wireless communication device according to a best mode (which will hereinafter be termed an embodiment) for carrying out the present invention will hereinafter be described with reference to the drawings. Configurations in the following embodiments are exemplifications, and the present invention is not limited to the configurations in the embodiments.

The present embodiments will roughly discuss a MISO (Multi Input Single Output) configuration, a MIMO (Multi Input Multi Output) configuration and examples of a communication system in respective cases in the communication system that switches over a communication procedure corresponding to a speed of how fast fading fluctuates.

<<Principle of System>>

The present communication system selects the communication procedure suited to the speed of fading occurred on the propagation path. Namely, the present communication system is that a pilot signal is transmitted and received between a transmitting-side wireless communication device and a receiving-side wireless communication device, and a fluctuation speed of fading is estimated from a value of a time correlation of the received pilot signal (received pilot signal). Herein, the time correlation of the received pilot signal is defined as a quantity indicating how much the received pilot signal at a certain point of timing $t-\tau$ is the same as the received pilot signal at slightly later timing t. For calculating the time correlation of the received pilot signal, the wireless communication device may include a means for registering the value of the received pilot signal that will be explained below for a predetermined period of time in a memory, and a means for calculating the value of the received pilot signal registered in the memory in order to calculate the time correlation. Moreover, the wireless communication device may also include a memory and an arithmetic means for conducting maximum ratio combining of the time correlation value.

Figure 1:
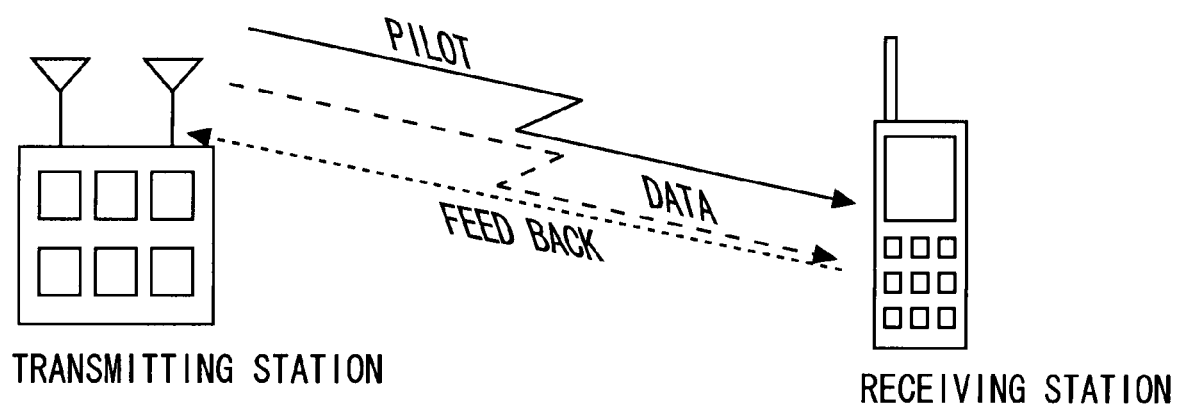
FIG. 1 is a diagram illustrating a MISO architecture.
Figure 2:
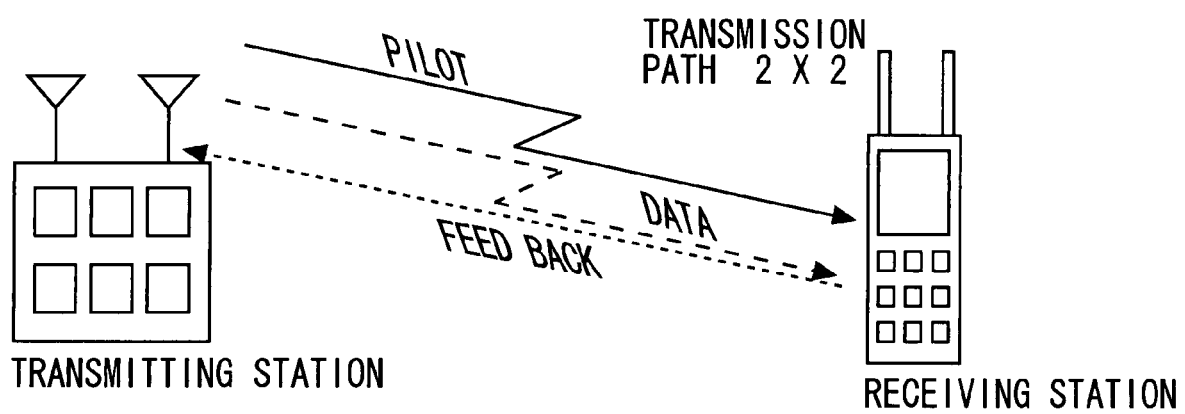
FIG. 2 is a diagram illustrating a MIMO architecture.
Figure 3:
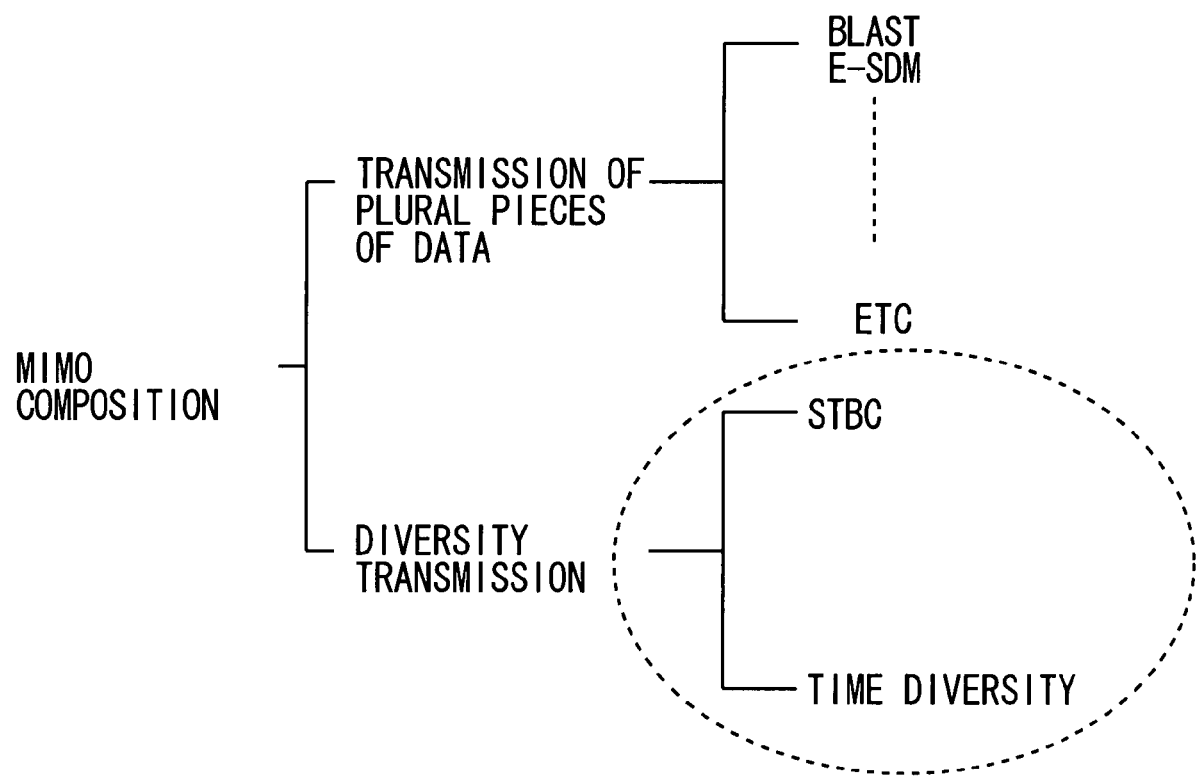
FIG. 3 is an explanatory diagram showing how applied areas are located.
Figure 4:
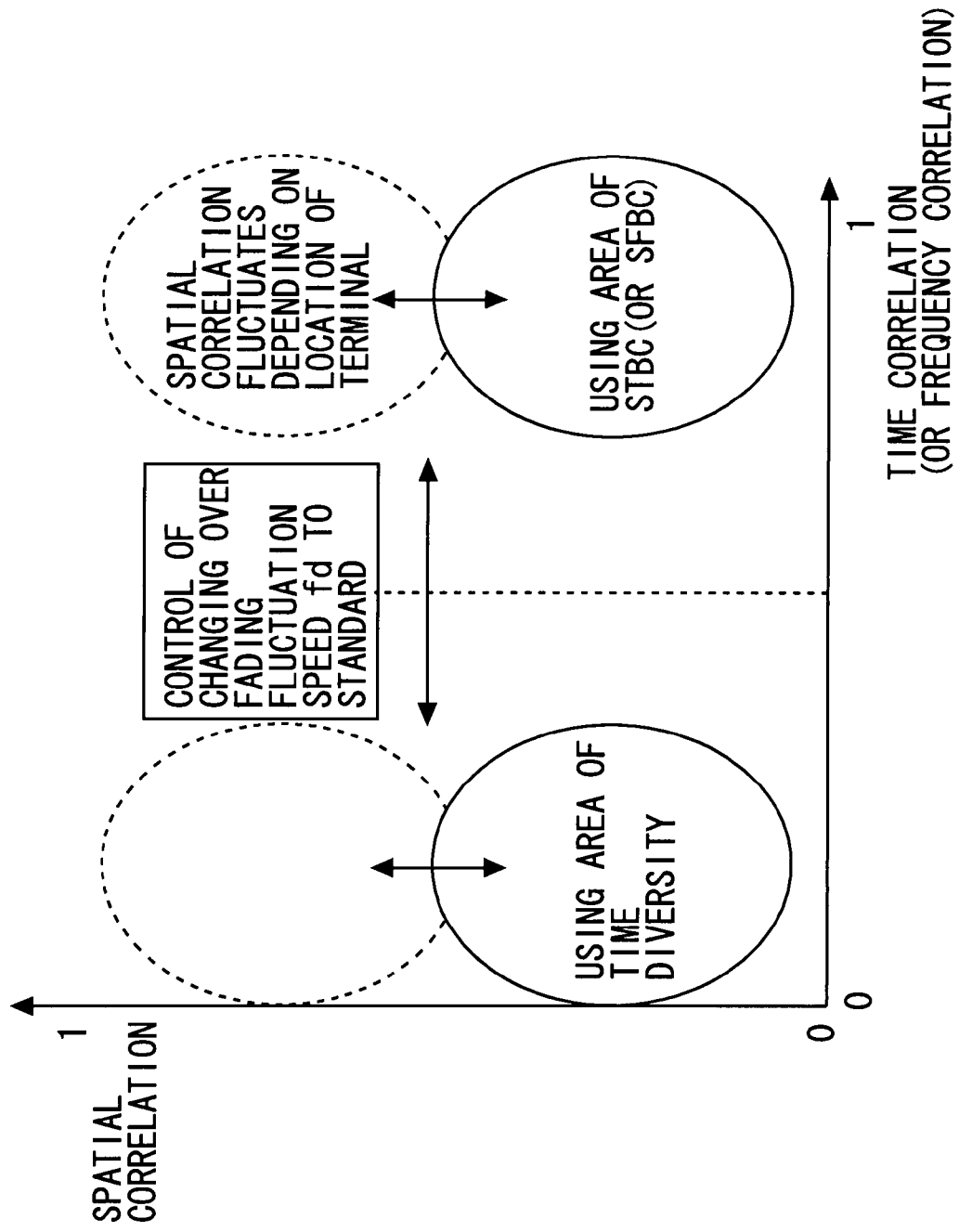
FIG. 4 is a diagram showing a concept of a diversity changeover method.

FIG. 4 illustrates, when transmission diversity is selected as a communication procedure, a relation of the transmission diversity in a case where the time correlation of the received pilot signal is large, a case where a spatial correlation is large and a case where both of the time correlation and the spatial correlation are large. Thus, generally, the time diversity effectively functions when the time correlation of the received pilot signal is small, while STBC (or SFBC (Space Frequency Block Coding) effectively functions when the time correlation is large.

Figure 5:
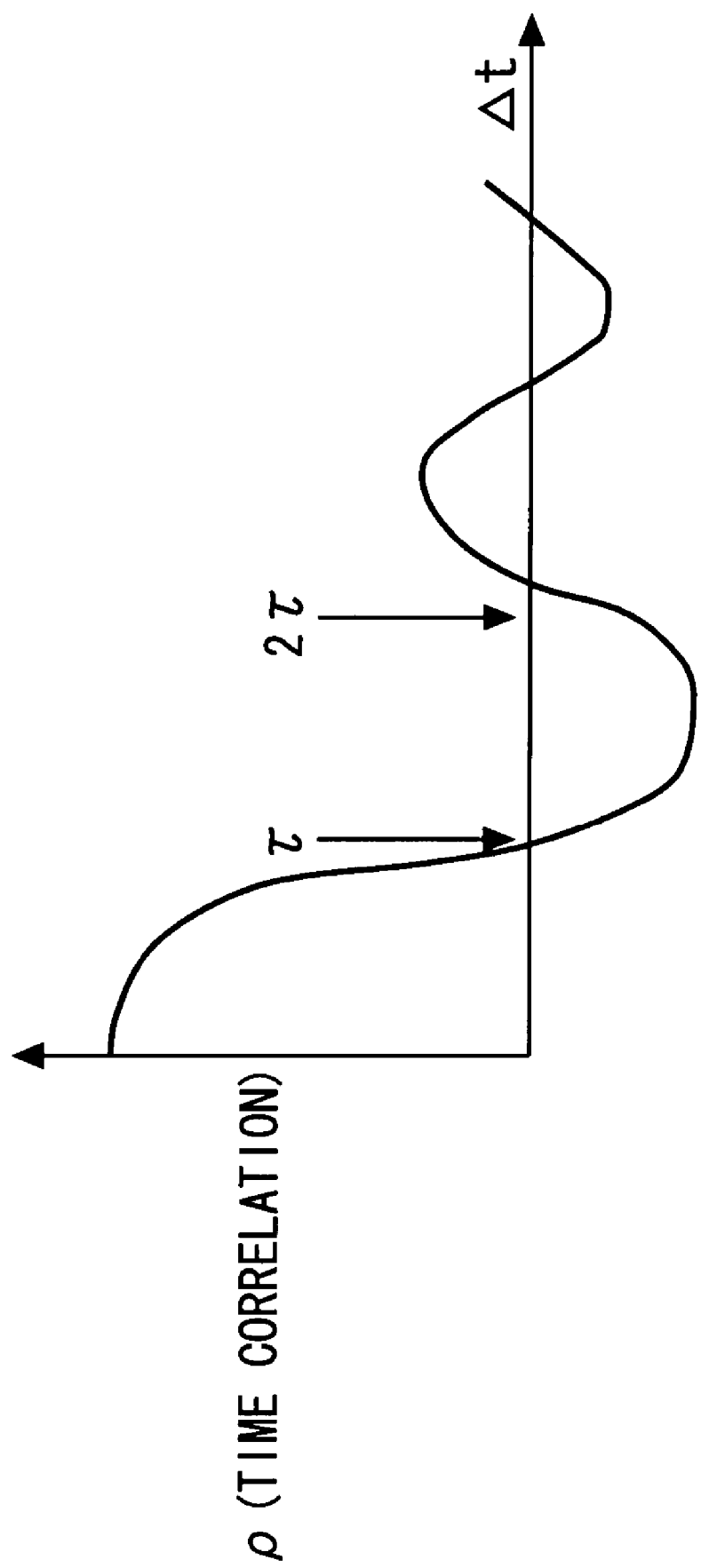
FIG. 5 is a graph showing an example of a time correlation of a received pilot signal.

FIG. 5 shows an example of calculating a time correlation ρ of the received pilot signal. FIG. 5 illustrates a correlation of the same received pilot signal received between at a certain point of timing $t_0$ and timing $t_0+\Delta t$. Herein, the time correlation ρ takes a quantity equivalent to "1" if one of the fluctuation occurs on the propagation path even when receiving the same pilot signal at different points of timing. While on the other hand, if the fluctuation on the propagation path is extremely large, the value of ρ is a quantity equivalent to a value approximate to "0". Such being the case, a fluctuation characteristic of fading can be acquired from the time correlation of the pilot signal. A shortest time difference Δt having a correlation that becomes "0" with respect to fading fluctuation calculated as the time correlation of the received pilot signal, i.e., taking a value within a predetermined allowable value range, is obtained as τ, and this τ is utilized as retransmission timing of the same radio signal when making use of the time diversity.

Further, since the time correlation decreases at even timing of an integral multiple of τ, the same radio signal is retransmitted at even timing of a multiple of a natural number of τ, and a quality of the wireless communications can be enhanced by further diversity.

FIG. 19 shows characteristics of respective communication methods. To be specific, with respect to the time diversity, the STBC in the case of having two transmitting antennas and the STBC in the case of having three or more transmitting antennas, FIG. 19 gives descriptions of a degree of easiness to signal orthogonalization, a condition about a magnitude (diversity dimension) in which the diversity is obtained, and feedback information required other than bits for selection the communication procedure when selecting the time diversity and the STBC.

As for the code orthogonality, the time diversity being the diversity with respect to the time, the orthogonal code encoding can not be done. On the other hand, only the STBC in the case of having the two antennas gets a known solution, whereby the code orthogonality can be easily attained. By contrast, the solution is not established only in a case where complex mapping is conducted with the STBC having the three or more antennas, with the result that the code orthogonal method becomes complicated.

The diversity dimension represents a magnitude of gain based on the diversity. The diversity dimension takes a numerical value proportional to the number of the transmitting antennas, wherein the diversity dimension is, for example, "2" in the case of the time diversity when transmitted twice, "2" if the spatial correlation is approximate to "0" with the STBC in the case of having the two transmitting antennas, and "3" if the spatial correlation is approximate to "0" in the case of having the three or more transmitting antennas. The diversity dimension in the case of the time diversity is "2" when transmitted twice and is "3" when transmitted three times, which is a highly exemplary instance.

As items of feedback information other than the feedback information for selecting the communication procedure, the time diversity needs the feedback information of the transmission timing, the STBC in the case of having the two transmission antennas does not require the feedback information, and the STBC having the three or more transmitting antennas needs the feedback information on the selection of the code sequence.

As an effect when the fading fluctuation is fast, when employing the time diversity, an effect on the order of 0.2 dB on the average is obtained, and an effect on the order of several 10 dB is instantaneously acquired, wherein the reference is the STBC in the case of having the two transmitting antennas. In particular, if the spatial correlation between the transmitting antennas is high, the STBC utilizing the space between the transmitting antennas declines, and hence a larger effect than by the STBC is acquired. On the other hand, though the STBC in the case of having the three or more transmitting antennas can also restrain the instantaneous deterioration, there might be a case in which inter-symbol interference occurs if the fading fluctuation is fast, with the result that an effect acquired is as low as −0.3 dB.

FIG. 20 shows bit sequences and definitions of the feedback information used for changing over the communication procedure. An STBC mode sequence 1 when the bit sequence is "000" implies that the STBC is conducted with the two transmitting antennas, and an STBC mode sequence 2 when the bit sequence is "001" implies that the STBC is conducted with the three or more transmitting antennas. When the bit sequences are "010", "011", "101", "110" and "111", the same signal is transmitted twice for periods of time such as 0.2 ms, 0.3 ms, 0.4 ms and 0.5 ms corresponding to the period timing τ.

The feedback information shown in FIG. 20 is selected corresponding to a value of the period timing τ calculated each time with respect to the received signal. For instance, it is assumed that the timing τ "0.17 ms" be acquired as a result of the calculation of the time correlation. The period timing τ (0.17 ms) is defined to be equal to or longer than 0.1 ms but shorter than 0.2 ms, and a time diversity delay "0.2 ms" associated with the bit sequence "011" is selected in FIG. 20. Another example of the assumption is that the period timing τ "0.53 ms" be acquired as a result of the calculation of the time correlation. In this example, the timing τ is sufficiently large, and therefore the STBC is more effective than the time diversity. Accordingly, it follows that the STBC associated with the bit sequence "000" or "001" is selected based on a non-described predetermined standard. This standard gives mode setting, wherein the STBC mode sequence 1 is selected when the value of the period timing τ is equal to or longer than 0.5 ms but shorter than 0.7 ms, and the STBC mode sequence 2 is selected when the value of the period timing τ is beyond this range. Then, if the system has a high throughput of the time diversity, it is preferable that the bit sequence "111" be selected in place of "010" when the period timing τ takes a value of 0.08 ms. Thus, the bit sequence associated with the timing τ is selected.

Figure 6:
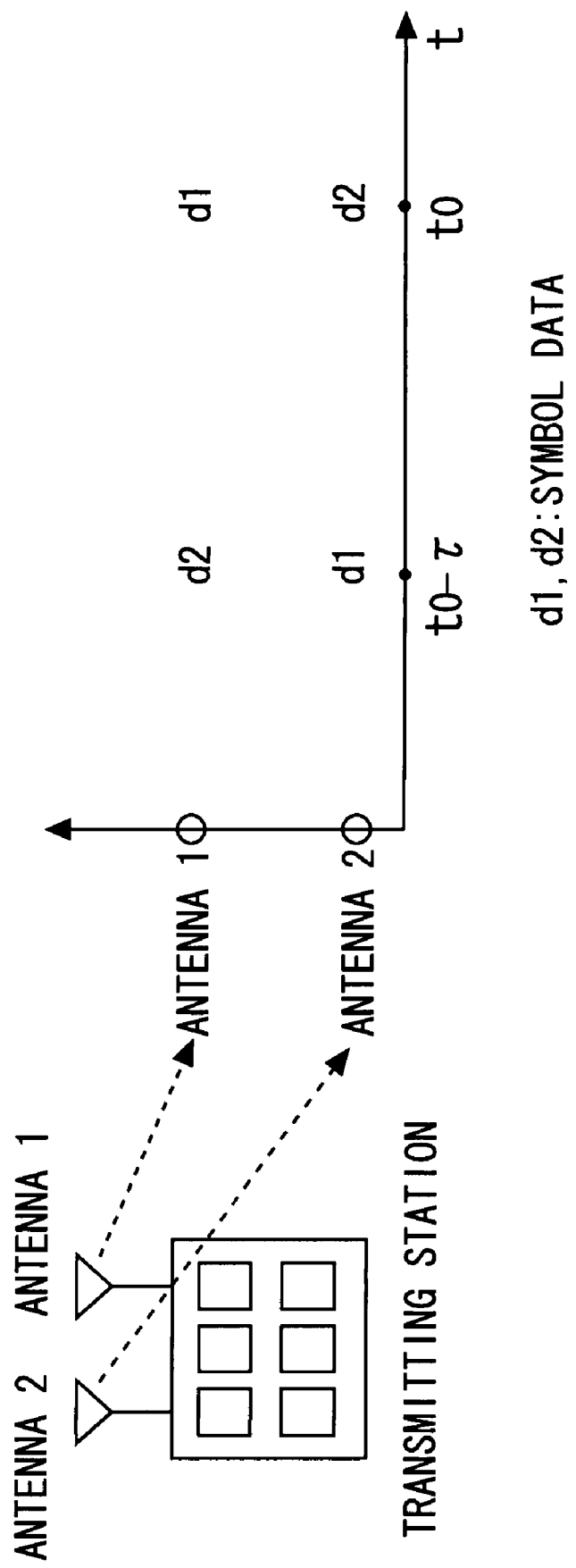
FIG. 6 is a diagram showing an example of a scheme of transmission of time diversity via multi antennas.

FIG. 6 shows a transmission example of the time diversity in the case of employing a plurality of transmitting antennas and a plurality of receiving antennas (in the case of the MIMO configuration (MIMO architecture). After transmitting symbol data $d_2$ from an antenna 1 and symbol data $d_1$ from an antenna 2 at the timing $t_0-\tau$, the symbol data $d_1$ is transmitted from the antenna 1 and the symbol data $d_2$ is transmitted from the antenna 2 at the timing $t_0$. Then, these symbols are demodulated and combined, thereby obtaining the time-based diversity.

The following discussion will deal with a principle of the system that detects the time correlation and will be made in the way of being separated into the MISO architecture and the MIMO architecture.

<System Principle in the Case of MISO Configuration>

A communication system in the case of the wireless communication device taking the MISO architecture will be described.

To begin with, let $p_i(t)$ be a reference pilot signal for the signal via an antenna i within the plurality of transmitting antennas. The reference pilot signal is defined as a symbol pattern determined in a certain communication system. Accordingly, this pattern is known to the receiving side, and hence the reference pilot signal is used as a reference signal when receiving and demodulating other symbols.

Then, let $R_i(t)$ be a received pilot signal after orthogonal-code-decoding the orthogonal-code-encoded signal transmitted from the antenna i. A reason why the signal needs the orthogonal code encoding in the transmitter is that the transmitter transmits the signals from the plurality of antennas, while the receiver receives the signals with a less number of antennas than those of the transmitter. Therefore, after the signals have been orthogonal-code-encoded by the transmitter, the signals received by the receiver are orthogonal-code-decoded and then extracted.

Supposing that the pilot signal passing through the propagation path is weighted, a relation of the pilot signal $R_i(t)$ with respect to a propagation path fluctuation $h_i(t)$ can be considered such as $R_i(t)=h_i(t)p_i(t)+n_i(t)$, where $n_i(t)$ is a noise. For simplifying a theory, the noise $n_i(t)$ is a white noise, i.e., shall take such a random value that a sum or an integral about t of $n_i(t)$ is "0".

It is assumed that the reference pilot signal in the present communication system is standardized to establish a relation of $|p_i(t)|^2=1$, where "| |" represents an absolute value. The signals in the present embodiment are all considered as complex numbers, and hence a relation of $|p_i(t)|^2=p_i(t)\times p_i^*(t)$ is established, where "*" represents complex conjugate of a target variable.

At first, it is considered that the propagation path fluctuation $h_i(t)$ is extracted by use of the received pilot signal $R_i(t)$ and the reference pilot signal $p_i(t)$. Then, $p_i^*(t)R_i(t)$ becomes $h_i(t)+p_i^*(t)n_i(t)$ by use of the condition given above. This formula gives a quantity obtained by adding the noise $p_i^*(t) n_i(t)$ to the propagation path fluctuation $h_i(t)$. A reason why $p_i^*(t)n_i(t)$ is considered to be the noise in the same way as $n_i(t)$ is the noise, is recognized from a point that $p_i(t)$ is a complex number and has a magnitude of "1" and a point that $n_i(t)$ is a complex number and takes a random value.

(Time Correlation about Signal from Single Transmitting Antenna)

The following formula represents a time correlation between the propagation path fluctuation $h_i(t)$ and $h_i(t-\tau)$. If the correlation characteristic between N-pieces of difference transmitting antennas, it is considered, remains substantially unchanged, the value given in the formula is considered to be substantially unchanged even by selecting any one of the transmitting antennas. Accordingly, if it is considered that the correlation characteristic between the transmitting antennas remains substantially unchanged, the time correlation of the fluctuation on the propagation path can be regarded as the time correlation with respect to the propagation path fluctuation $h_i(t)$ and $h_i(t-\tau)$, where t corresponds to a first reference point according to the present invention, and $t-\tau$ corresponds to a second reference point. A denominator is a standardizing condition for setting the value of the time correlation to a value ranging from "0" to "1". Herein, let $\sigma^2$ be dispersion of the noise.

$$\rho_a = \frac{\frac{1}{T}\int_{-T/2}^{T/2}[p_i^*(t)R_i(t)\times \{p_i^*(t-\tau)R_i(t-\tau)\}^*]dt}{\sqrt{\frac{1}{T}\int_{-T/2}^{T/2}[p_i^*(t)R_i(t)\times \{p_i^*(t)R_i(t)\}^*]dt - \sigma^2}\sqrt{\frac{1}{T}\int_{-T/2}^{T/2}[p_i^*(t-\tau)R_i(t-\tau)\times \{p_i^*(t-\tau)R_i(t-\tau)\}^*]dt - \sigma^2}} \quad (1)$$

The formula (1) gives the value of the time correlation about the propagation path fluctuation, which can be presumed from a point that $p_i^*(t)n_i(t)$ takes a form of adding the noise to the propagation path fluctuation $h_i(t)$. To start with, the formula (1) will be explained, and a method of acquiring the noise dispersion $\sigma^2$, which is not yet obtained in the formula (1), will be shown.

The time diversity is effective especially in an area where fading, i.e., the propagation path fluctuation is large. This is useful particularly in an area where the value of the time correlation given in the formula described above is approximate to "0". Hence, the timing $\tau$ needed for employing the time diversity can be obtained as the shortest time in the conditions under which the formula described above gives "0".

Then, the noise dispersion $\sigma^2$ will be obtained as below. Let s be the number of symbols used for the signals. An average value about t of $p_i^*(t)n_i(t)$ disappears in terms of its influence by addition, and hence the formula (2) gives the average value of the propagation path fluctuations.

$$\bar{h}_i(t) = \frac{1}{(2s+1)}\sum_{t=t-s}^{t+s} p_i^*(t)\{h_i(t)p_i(t) + n_i(t)\} = \frac{1}{(2s+1)}\sum_{t=t-s}^{t+s} p_i^*(t)R_i(t) \quad (2)$$

The noise dispersion $\sigma^2$ is obtained by using $\bar{h}_i(t)$ given in the formula described above. "$p_i(t)\bar{h}_i(t)$" is a product of the propagation path fluctuation and the reference pilot signal. The received pilot signal $R_i(t)$ is expressed by $h_i(t)p_i(t)+n_i(t)$, so that the noise dispersion is given in the formula (3).

$$\sigma^2 = \frac{1}{T}\int_{-T/2}^{T/2}|R_i(t) - p_i(t)\bar{h}_i(t)|^2 dt \quad (3)$$

The value in the formula (1) can be obtained by substituting the values of the received signal into the formulae (1), (2) and (3).

Herein, it is demonstrated that the formula (1) is a formula for obtaining the time correlation with respect to the propagation path fluctuation $h_i(t)$.

The formula (1) is developed on a numerator basis and on a denominator basis. Herein, n'(t) is given such as $n'(t)=p^*(t)n(t)$. Then, there is established a relation such as $|n''(t)|=|p(t)| |n(t)|=|n(t)|$. This relation will be utilized later on.

The numerator of the formula (1) is given by the formula (4).

Numerator $$= \frac{1}{T}\int_{-T/2}^{T/2}[\{h_i(t)+n'(t)\}\times \{h_i(t-\tau)+n'(t-\tau)\}^*]dt \quad (4)$$

$$= \frac{1}{T}\int_{-T/2}^{T/2}\{h_i(t)h_i^*(t-\tau) + h_i(t)n'^*(t-\tau) + n'(t)h_i^*(t-\tau) + n'(t)n'^*(t-\tau)\}dt$$

$$= \frac{1}{T}\int_{-T/2}^{T/2} h_i(t)h_i^*(t-\tau)dt$$

Left Side of Denominator $$= \sqrt{\frac{1}{T}\int_{-T/2}^{T/2}\{h_i(t)+n'(t)\}\times\{h_i(t)+n'(t)\}^*dt - \sigma^2} \quad (5)$$

$$= \sqrt{\frac{1}{T}\int_{-T/2}^{T/2}\{h_i(t)h_i^*(t)+h_i(t)n'^*(t)+n'(t)h_i^*(t)+n'(t)n'^*(t)\}dt - \sigma^2}$$

$$= \sqrt{\frac{1}{T}\int_{-T/2}^{T/2}|h_i(t)|^2 dt + \frac{1}{T}\int_{-T/2}^{T/2}|n_i'(t)|^2 dt - \sigma^2}$$

$$= \sqrt{\frac{1}{T}\int_{-T/2}^{T/2}|h_i(t)|^2 dt}$$

A first factor of the denominator is given by the formula (5). A second factor of the denominator can be obtained in the same way as by the formula (5).

With the operations described above, when making the use of the results of the formulae (4) and (5), the formula (1) is developed into the formula (6). It is therefore recognized that the formula (1) gives the value of the time correlation with respect to the propagation path fluctuation.

$$\rho_a = \frac{\int_{-T/2}^{T/2} h_i(t)h_i^*(t-\tau)dt}{\sqrt{\int_{-T/2}^{T/2}|h_i(t)|^2 dt}\sqrt{\int_{-T/2}^{T/2}|h_i(t-\tau)|^2 dt}} \quad (6)$$

Accordingly, a portion taking the value "0" in the formula (1) is the same as a portion taking "0" as the value of the time correlation in the formula (7).

$$\frac{\int_{-T/2}^{T/2} h_i(t)h_i^*(t-\tau_1)dt}{\sqrt{\int_{-T/2}^{T/2}|h_i(t)|^2 dt}\sqrt{\int_{-T/2}^{T/2}|h_i(t-\tau_1)|^2 dt}} = 0 \quad (7)$$

Note that the correlation value given in the formula (6) may be evaluated by a correlation coefficient $\rho_p$ expressed in the formula (8). For acquiring a gain based on the time diversity, the correlation coefficient involves using a comparatively small predetermined value, e.g., 0.6 as an empirical value.

$$\rho_p = |\rho_a|^2 = \rho_a \rho_a^* \quad (8)$$

(Example of Maximum-Ratio-Combining of Signals from Plural Transmitting Antennas)

The configuration described above utilizes the signals from the single transmitting antenna. In place of this configuration, a configuration in FIG. 6 may utilize the signals transmitted by the plurality of transmitting antennas and received by the single receiving antenna. The formula (9) shows how the time correlation with respect to the pilot signal for every transmitting antenna is subjected to the maximum ratio combining in regard to the transmitting antenna. Herein, $\rho_a(i)$ is the time correlation with respect to the transmitting antenna i. It is feasible to independently obtain "$\rho_a(i)$" in the formula (9) from the formula (1) and $h_i(t)$ and $h_i(t-\tau)$ in the formula (9) from the formula (2), respectively. Accordingly, the calculation of the formula (9) can be done based on $\rho_a(i)$, $h_i(t)$ and $h_i(t-\tau)$. The maximum ratio combining involves giving a weight in a way that deems an amplitude value given by a magnitude of $|h_i(t)|$ in the formula (2) as signal reliability.

$$|\rho_a| = \frac{1}{\sum_{i=1}^{N}|\bar{h}_i(t)||\bar{h}_i(t-\tau)|}\sum_{i=1}^{N}|\bar{h}_i(t)||\bar{h}_i(t-\tau)||\rho_a(i)| \quad (9)$$

(Formula of Calculation Including Spatial Correlation between Plural Transmitting Antennas)

A focus in the formulae (1) and (9) is put on the time correlation of the received pilot signal with respect to the same transmitting antenna. It is, however, preferable to employ an area in which the time-spatial correlation is low in terms of taking account of the space area between the transmitting antennas because of transmitting the same symbol data from the plurality of different transmitting antennas.

Figure 7:
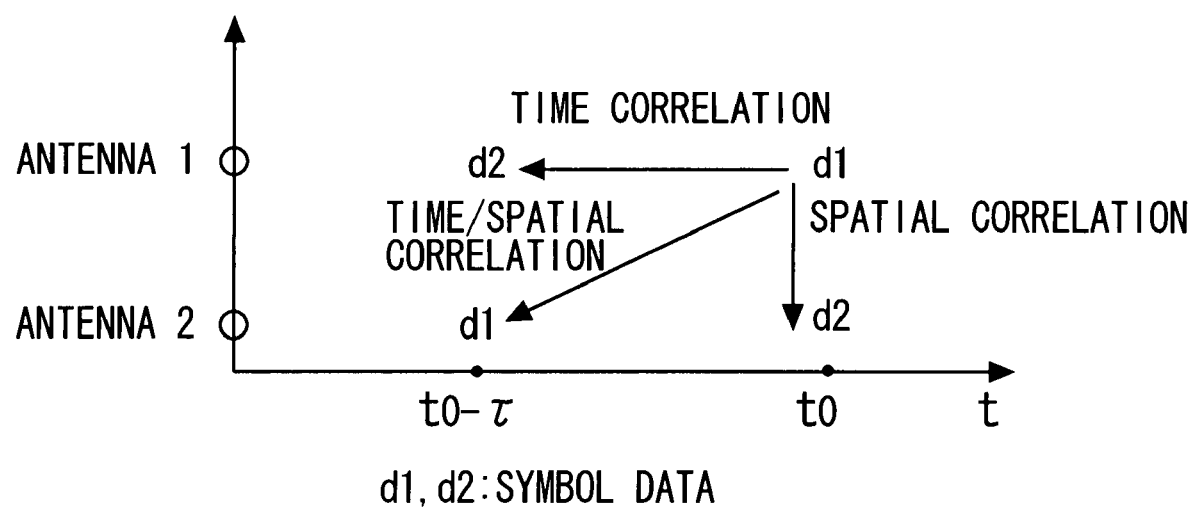
FIG. 7 is an explanatory diagram showing a diversity gain by use of a time-spatial area.

FIG. 7 is a conceptual diagram illustrating how a gain of the diversity in the time-spatial area is obtained in the MIMO architecture. Symbol data $d_1$ transmitted from the antenna 1 at the timing $t_0$ is the same as the symbol data $d_1$ transmitted from the antenna 2 at the timing $t_0-\tau$. Accordingly, the calculation of the correlation with respect to the signals transmitted from the different transmitting antennas at different points of timing leads to the consideration of the space correlation as well as of the time correlation, whereby the calculation with the higher accuracy can be expected.

Let i be the focused transmitting antenna, let j be the transmitting antenna for the diversity, and, if a value of i is different from a value of j, the time-spatial correlation can be calculated from the formula (10).

$$\rho_a = \frac{\frac{1}{T}\int_{-T/2}^{T/2}[p_i^*(t)R_i(t)\times\{p_j^*(t-\tau)R_j(t-\tau)\}^*]dt}{\sqrt{\frac{1}{T}\int_{-T/2}^{T/2}[p_i^*(t)R_i(t)\times\{p_i^*(t)R_i(t)\}^*]dt - \sigma^2}\sqrt{\frac{1}{T}\int_{-T/2}^{T/2}[p_j^*(t-\tau)R_j(t-\tau)\times\{p_j^*(t-\tau)R_j(t-\tau)\}^*]dt - \sigma^2}} \quad (10)$$

Thus, it is possible to calculate the time correlation between the received signals in combinations of the transmitting antennas with respect to the pilot signals received from the plurality of transmitting antennas.

Further, the calculation in the formula (10) is made in a way that emphasizes only neighboring antennas j=i+1 (or j=i−1) that tend to exhibit the highest correlation in the case of using the three or more transmitting antennas, and the shortest period timing exhibiting a low correlation in the time-spatial area may also be detected. The system load attributed to the arithmetic processes can be restrained to a greater degree with a less number of combinations as of the neighboring antennas.

<Principle of MIMO Architecture>

The present communication system in the case of a wireless transmitting device based on the MIMO architecture will be explained.

The wireless transmitting device based on the MIMO architecture includes a plurality of antennas also on a receiver side. The receiver has M-pieces of receiving antennas.

At first, an emphasis is put on the pilot signal transmitted from the transmitting antenna i. A pilot signal $R_{i,k}(t)$ transmitted from the transmitting antenna having an antenna number i and received by the receiving antenna having an antenna number k is given by $R_{i,k}(t)=\{h_{i,k}(t)p_{i,k}(t)+n_{i,k}(t)\}$, where $p_{i,k}(t)$ is a reference pilot signal, and $n_{i,k}(t)$ is a noise.

Enhancement of a quality of the pilot signal transmitted from each of the transmitting antennas involves using the maximum ratio combining for the receiving antennas. Considered is a case of extending the single receiving antenna to the M-pieces of receiving antennas in the formulae (1), (9) and (10).

The formula (11) expresses such a time correlation that the maximum ratio combining is not conducted with the transmitting antennas i, j and the receiving antenna k.

$$\rho_a(i, j, k) = \frac{\frac{1}{T}\int_{-T/2}^{T/2}[p_{i,k}^*(t)R_{i,k}(t)\times\{p_{j,k}^*(t-\tau)R_{j,k}(t-\tau)\}^*]dt}{\sqrt{\frac{1}{T}\int_{-T/2}^{T/2}[p_{i,k}^*(t)R_{i,k}(t)\times\{p_{i,k}^*(t)R_{i,k}(t)\}^*]dt-\sigma^2}\sqrt{\frac{1}{T}\int_{-T/2}^{T/2}[p_{j,k}^*(t-\tau)R_{j,k}(t-\tau)\times\{p_{j,k}^*(t-\tau)R_{j,k}(t-\tau)\}^*]dt-\sigma^2}} \quad (11)$$

The formulae (12)-(14) are the formulae given by use of the formula (11) in the case of extending the single receiving antenna to the M-pieces of receiving antennas in the formulae (1), (9) and (10). Definitions of the respective formulae have been made in the explanatory items of the principle of the MISO architecture as those of the corresponding formulae in the case of the single receiving antenna. If the two or more receiving antennas are provided, the maximum ratio combining is performed for the receiving antennas. In the case of the single receiving antenna, this corresponds to the case of M=1, and hence the formulae (12)-(14) are those including the formulae (1), (9) and (10).

$$|\rho_a| = \frac{1}{\sum_{k=1}^{M}|\bar{h}_{i,k}(t)||\bar{h}_{i,k}(t-\tau)|}\sum_{k=1}^{M}|\bar{h}_{i,k}(t)||\bar{h}_{i,k}(t-\tau)||\rho(i,i,k)| \quad (12)$$

$$|\rho_a| = \frac{1}{\sum_{i=1}^{N}\sum_{k=1}^{M}|\bar{h}_{i,k}(t)||\bar{h}_{i,k}(t-\tau)|}\sum_{i=1}^{N}\sum_{k=1}^{M}|\bar{h}_{i,k}(t)||\bar{h}_{i,k}(t-\tau)||\rho(i,i,k)| \quad (13)$$

$$|\rho_a| = \frac{1}{\sum_{k=1}^{M}|\bar{h}_{i,k}(t)||\bar{h}_{j,k}(t-\tau)|}\sum_{k=1}^{M}|\bar{h}_{i,k}(t)||\bar{h}_{j,k}(t-\tau)||\rho(i,j,k)| \quad (14)$$

Evaluation of the value of τ may involve using a correlation coefficient obtained by any one of the formulae (12)-(14) or by the formula (8).

The scheme given above by way of one of the embodiments is that the timing τ at which the time correlation takes the value approximate to "0" and is within the predetermined range and becomes the shortest time (e.g., the timing at which the correlation coefficient (formula (8)) is equal to or smaller than 0.6 and becomes the shortest time), is set as the transmission diversity changeover timing. The embodiment of the present invention is not, however, limited to this value. Each of other predetermined values may also be a basis for changing over the communication procedure as the value of the time correlation and as the correlation coefficient.

The description given above has dealt with the calculation of the time correlation of the received pilot signal, however, the quantity of the arithmetic processes executed by the receiver can be also restrained by approximating the formula concerned to a formula requiring a less quantity of arithmetic operation for the calculation and thus utilizing this formula.

The present embodiment has exemplified the mode of calculating the time correlation of which the quantity is equivalent to the propagation path fluctuation by employing the received pilot signal and the reference pilot signal, however, the timing τ may also be determined not for the propagation path fluctuation but from the time correlation of the received pilot signal itself or from the correlation coefficient.

Next, a transmitting unit and a receiving unit of the wireless communication device will be explained.

<<Device and Operation of Device>>

<Transmitting Unit 1>

Figure 8:
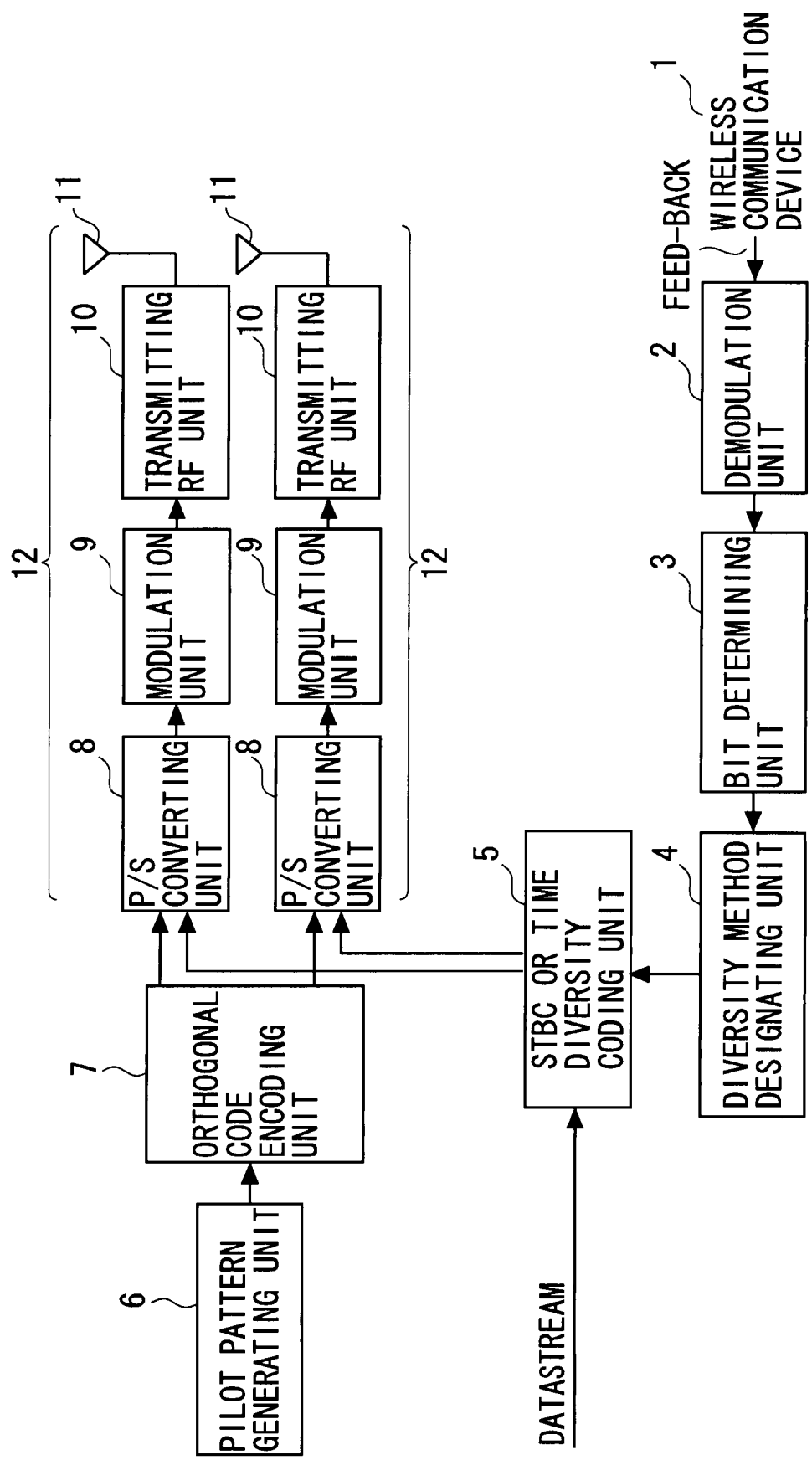
FIG. 8 is a diagram showing a system configuration of a transmitting unit 1.

FIG. 8 is a block diagram illustrating a configuration of a first working example of the transmitting unit of the wireless communication device employed in the present communication system. The block diagram illustrates an example of providing the two transmitting antennas. The transmitting unit includes a pilot pattern generating unit 6, an orthogonal code encoding unit 7 and transmission modules 12. Each of the transmission modules 12 is constructed of a P/S (parallel/serial) converting unit 8, a modulation unit 9, a transmission RF (Radio Frequency) unit 10 and a transmitting antenna 11. Further, the transmitting unit has an STBC-or-time diversity encoding unit 5 for encoding a datastream.

The present transmitting unit is characterized by including a diversity designating unit 4 for controlling the STBC-or-time diversity encoding unit 5 and a bit determining unit 3 for extracting feedback information from a demodulation signal in order to control the STBC-or-time diversity encoding unit 5.

The respective units will hereinafter be described.

The demodulation unit 2 has an antenna for receiving the feedback information from the wireless communication device 1 as a communication partner device, and receives the feedback information (which corresponds to [means receiving a command to change over a communication procedure from a partner communication device] according to the present invention). Then, the demodulation unit 2 demodulates and transmits the received feedback information to the bit determining unit 3.

The bit determining unit 3 makes bit determination about the feedback information. To be specific, the bit determining unit 3 extracts a bit sequence designating an encoding method from the demodulated feedback information. The demodulation unit 2 and the bit determining unit 3 correspond to [means receiving designation to change over the communication procedure] according to the present invention. Thereafter, the bit determining unit 3 notifies the diversity method designating unit 4 of the bits thereof.

The diversity method designating unit 4, upon receiving the bits of the feedback information from the bit determining unit 3, without executing any process for a preset period of predetermined time, sets the encoding method in the STBC-or-time diversity encoding unit 5 according to the feedback information after the predetermined time. The diversity method designating unit 4 and the STBC-or-time diversity encoding unit 5 correspond to [means performing changeover to selected communication means] according to the present invention.

The STBC-or-time diversity encoding unit 5 encodes datastream 12 by a designated encoding method.

The pilot pattern generating unit 6 generates and sends a pilot pattern to the orthogonal code encoding unit 7.

The orthogonal code encoding unit 7, after executing an orthogonal code encoding process of the pilot pattern, transmits the encoded pilot pattern to the P/S converting unit 8.

The P/S converting unit 8 takes time-multiplexing between the datastream encoded by the STBC-or-time diversity encoding unit 5 and the pilot pattern that has been subjected to the orthogonal-code-encoding process, and thereafter transmits the signal to the modulation unit 9. Herein, a data ratio to the pilot signal in the parallel-to-serial conversion may not necessarily be 1:1, and normally the time multiplexing is carried out to increase the ratio of the datastream.

The modulation unit 9 modulates digitally modulates the signals and maps the digital-modulated signals to signal constellation points.

The transmission RF unit 10 converts the digital signals into analog signals and, after performing upconverting into carrier wave frequencies, transmits the signals to the transmitting antenna 11.

<Transmitting Unit 2>

Figure 9:
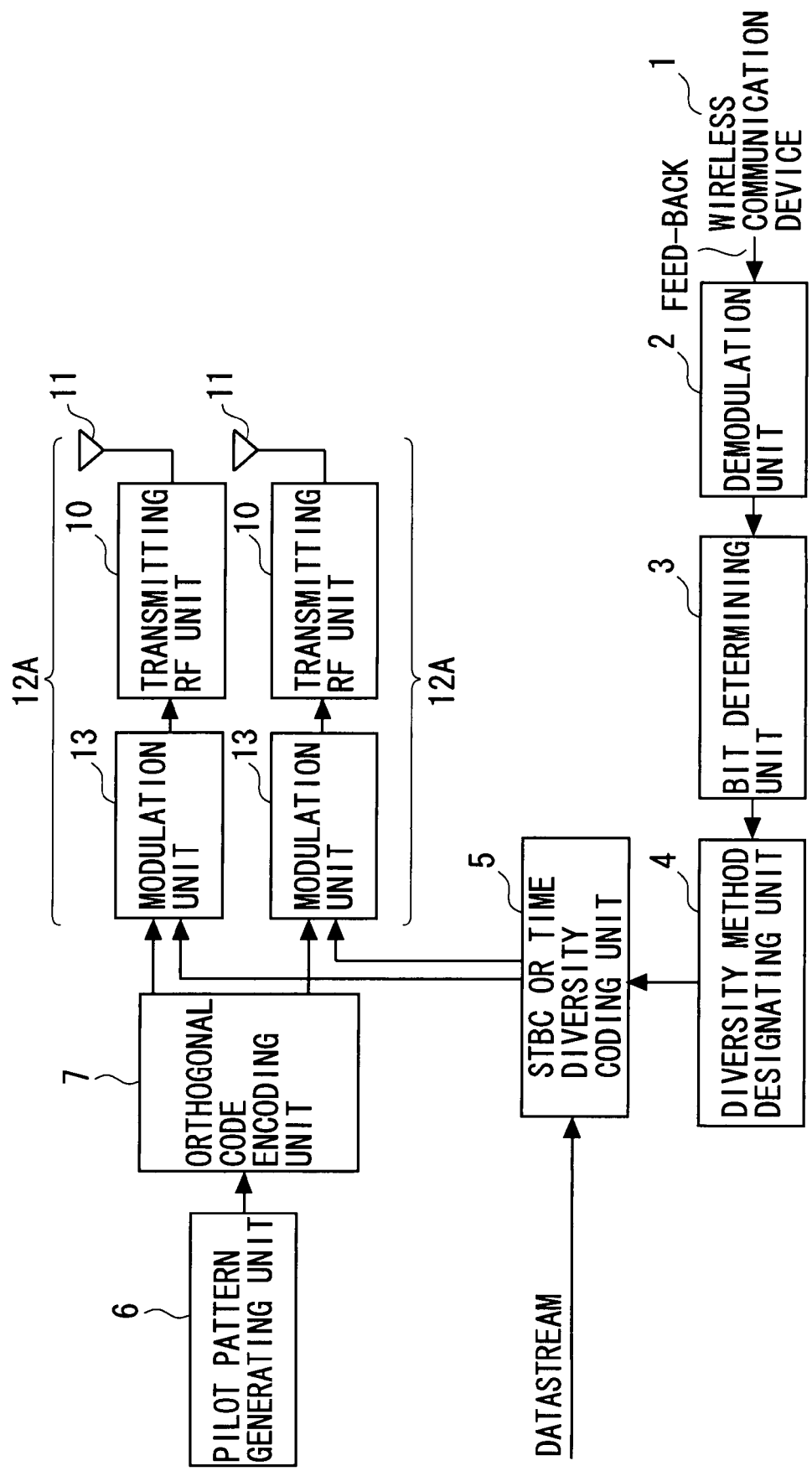
FIG. 9 is a diagram showing a system configuration of a transmitting unit 2.

FIG. 9 is a block diagram showing a configuration of a second working example of the transmitting unit of the wireless communication device used in the present communication system. The configuration of the transmitting unit of the wireless communication device illustrated in FIG. 9 is, for the most part, the same as the configuration shown in FIG. 8, and therefore the same processes as the processes described in the <Transmitting Unit 1> are marked with the same symbols in FIG. 9 as those in FIG. 8 while their explanations are omitted.

FIG. 9 illustrates a mode in which IQ separation in place of the time multiplexing is conducted by a modulation unit 13. Therefore, the P/S converting unit 8 and the modulation unit 9 are replaced by the modulation unit 13.

FIG. 9 illustrates the configuration of the transmitting unit, wherein the pilot signal and the datastream are subjected to the orthogonal code encoding process by use of I-Q axes. Therefore, the data ratio to the pilot signal is preferably 1:1. An improvement for increasing the data ratio can be attained by incrementing the data mapping points along the I-Q axes. This operation involves, however, changing an amplitude ratio on the I-Q axes and is not therefore so preferable. The pilot signal, occupying one orthogonal axis according to the orthogonal code encoding that uses the I-Q axes, can be transmitted and received by use of the communication unit. It is therefore possible to calculate the correlation in the communications exhibiting a higher quality than by using the P/S conversion.

It is feasible to employ, other than the transmitting units illustrated in FIGS. 8 and 9, a method of multiplexing on the frequency axis by use of an OFDM (Orthogonal Frequency Division Multiplexing) method, a method of code-multiplexing by use of a CDMA (Code Division Multiple Access) method, or a method of keeping orthogonality by combining these methods.

<Receiving Unit>

Figure 10:
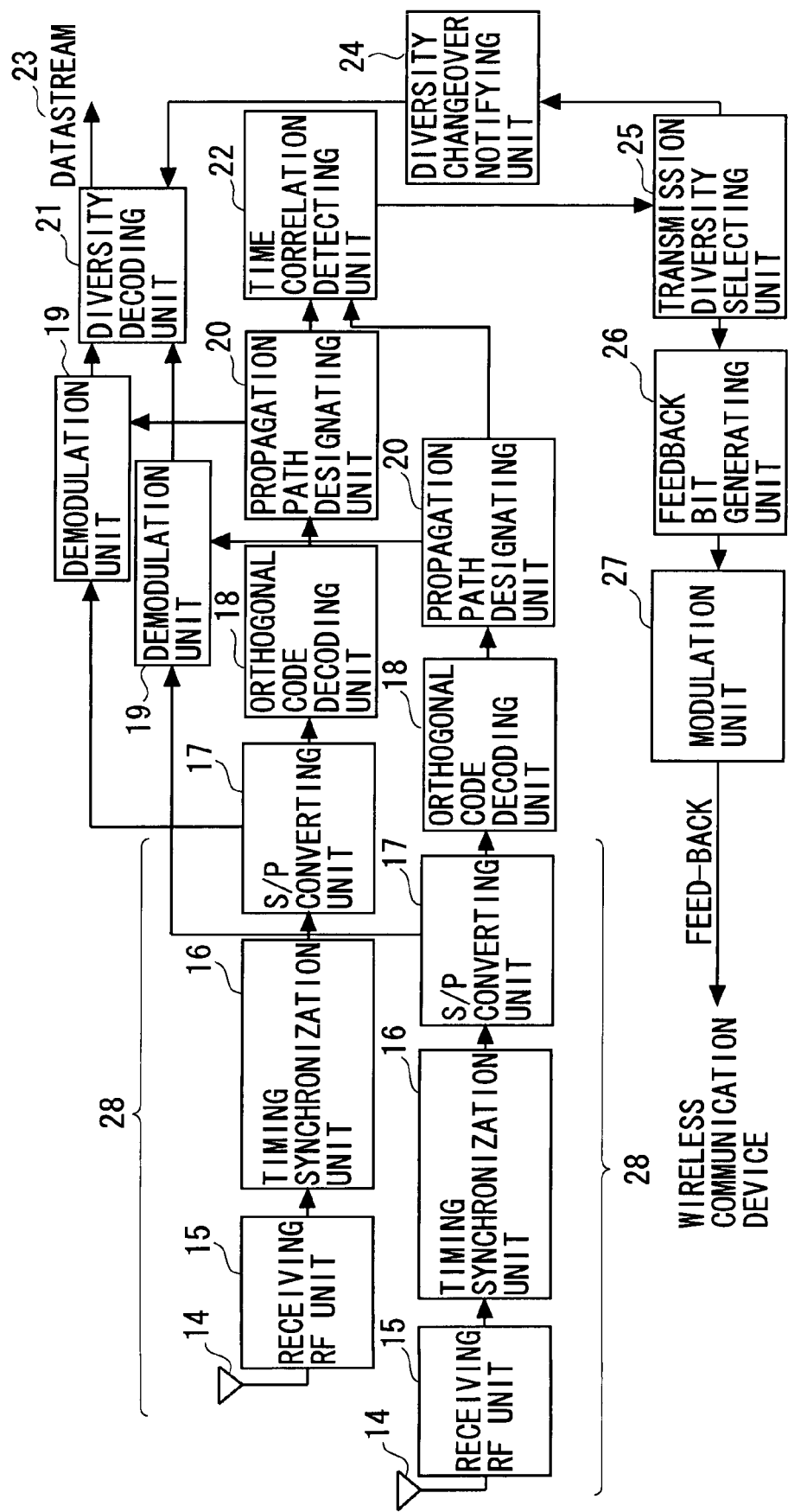
FIG. 10 is a diagram showing a system configuration of a receiving unit.

FIG. 10 is a block diagram showing a configuration of a first working example of a receiving unit of the wireless communication device in the present wireless communication system. FIG. 10 illustrates the receiving unit employed corresponding to the configuration of the transmitting unit in FIG. 8. The receiving unit includes demodulation units 19 and transmission modules 28, 28 of which the number becomes "2" in the case of providing the two receiving antennas. Each of the transmission modules 28, 28 has a receiving antenna 14, a reception RF unit 15, a timing synchronization unit 16 and a S/P (Serial/Parallel) converting unit 17.

The receiving unit is characterized by including a diversity decoding unit 21, an orthogonal code decoding unit 18, a propagation path estimating unit 20, a time correlation detecting unit 22, a diversity changeover notifying unit 24, a transmission diversity selecting unit 25 and a feedback bit generating unit 26.

The individual units thereof will hereinafter be described.

The receiving antenna 14 receives the signal from the partner communication device (which corresponds to [receiving means receiving a radio signal from a partner communication device] according to the present invention).

The reception RF unit 15, after downconverting the received signal, converts the signal into the digital signal and thereafter transmits the digital signal to the timing synchronization unit 16.

The timing synchronization unit 16, after detecting a path and performing AFC (Automatic Frequency Control) synchronization, synchronizes the timing for executing the signal processing. Thereafter, the timing synchronization unit 16 transmits the signal to the S/P converting unit 17.

The S/P converting unit 17 conducts the S/P (Serial/Parallel) conversion and separates the received pilot signal from the datastream.

The orthogonal code decoding unit 18 extracts the separated pilot signal as a received pilot signal from every transmitting antenna.

The propagation path estimating unit 20 estimates a fluctuation of the received signal on the propagation path by use of the received pilot signal and the reference pilot signal. Thereafter, the signals are transmitted to the demodulation unit 19 and the time correlation detecting unit 22.

The demodulation unit 19 corrects the fluctuation on the radio propagation path by determining maximum likelihood of the signal with the estimated value (channel estimated value) of the fluctuation on the propagation path between the transmitting and receiving antennas. Thereafter, the signals are transmitted to the diversity decoding unit 21.

The diversity decoding unit 21 decodes the signals according to a selected transmission diversity method, thereby generating datastream 23. On the occasion of decoding the signals, if the STBC is selected, the maximum ratio combining is carried out. If the time diversity is selected, however, delay information about a delay based on the propagation path and a delay based on the control will have been obtained when designing the system, and hence not the maximum ratio combining but an MPIC (Multi-Path Interference Canceller) can be also employed. Further, the diversity decoding unit 21, when receiving notification of changing over the transmission diversity method from the diversity changeover notifying unit 24, changes over a transmission diversity demodulation method to the notified transmission diversity demodulation method.

The time correlation detecting unit 22 has a memory stored with buffered data and an arithmetic processing device for the data registered in the memory. The time correlation detecting unit 22 registers the received pilot signals after being orthogonal-code-decoded for a predetermined period in time series in the memory (which corresponds to [means stored with received signals for a predetermined period] according to the present invention). Thereafter, the time correlation detecting unit 22 reads the data registered in the memory and calculates a time correlation within a predetermined time range. Then, the time correlation detecting unit 22 calculates, as timing $\tau$, such a shortest time difference that the value of the time correlation becomes "0" or the correlation coefficient gets equal to or smaller than 0.6 (which corresponds to [means obtaining a time difference between a first reference point of time and a second reference point of time when the time correlation takes a value within a predetermined range] according to the present invention). Then, the transmission diversity selecting unit 25 is notified of the value of τ.

The time correlation detecting unit 22 may include a function of receiving, from the diversity notifying unit 24, notification saying that none of the process is executed for a pre-designated period of time, and executing neither the registration of the received pilot signals in the memory nor the process of calculating the time correlation according to a built-in timer (which corresponds to [means stopping calculation of a time correlation] according to the present invention). Then, the time correlation detecting unit 22 may further include a function of starting detection of the time correlation after time determined by the built-in timer (which corresponds to [means starting the calculation of the time correlation] according to the present invention).

The transmission diversity selecting unit 25 selects the transmission diversity on the basis of the timing information τ (which corresponds to [selecting means selecting a wireless communication procedure designated corresponding to a time difference] according to the present invention). Then, the transmission diversity selecting unit 25 notifies the feedback bit generating unit 26 and the diversity changeover notifying unit 24 of the selected transmission diversity method.

Further, the transmission diversity selecting unit 25 includes a memory for registering the transmission diversity in use at the very point of time, and may have a function of updating the memory each time the selected transmission diversity method is adopted for the system, and giving, if the transmission diversity method selected based on the timing information τ of which the time correlation detecting unit 22 notifies is the same as the transmission diversity method read from the memory, the notification about changing over the transmission diversity method to neither the feedback bit generating unit 26 nor the diversity changeover notifying unit 24. This implies that the partner communication device is not notified of the selected transmission diversity method.

The diversity changeover notifying unit 24 changes over the communication procedure in a way that synchronizes the timing with the partner communication device. An in-depth description of the diversity changeover timing will be given in <Diversity Changeover Timing>.

The feedback bit generating unit 26 generates a bit sequence corresponding to the selected transmission diversity. Then, the bit sequence is sent as the feedback information to the modulation unit 27.

The modulation unit 27 modulates the feedback information, and transmits the feedback information to the partner wireless communication device via the radio propagation path (which corresponds to [instruction means instructing the partner communication device about the selected wireless communication means] according to the present invention).

On the other hand, a configuration of the receiving unit, which corresponds to the configuration of the transmitting unit in FIG. 9, is acquired by inserting a demodulation unit for the orthogonality using the I-Q axes in place of the S/P (Serial/Parallel) converting unit 17 and the demodulation unit 19 in FIG. 10.

<Restraint of Traffic of Feedback Information>

In the present wireless communication system, the transmitter and the receiver are notified of the transmission diversity, and hence a feedback bit count increases to a degree corresponding to the notification of the transmission diversity as compared with the prior arts. Such being the case, a function for reducing the traffic (a communication quantity) between the transmitter and the receiver will be explained.

FIG. 21 shows whether the transmission diversity or an ARQ (Automatic Repeat reQuest) is used for a diversity mode and for a MIMO multiplexing mode. Herein, "ON" represents the use of the communication procedure thereof, while "OFF" represents the non-use. The present communication system corresponds to the diversity mode, wherein the communication procedure is set up as in FIG. 21. In the case of employing the present communication system, a communication quality is enhanced by the transmission diversity, and it is therefore possible to make ACK/NACK (acknowledgement/non-acknowledgement) information to the retransmission control (ARQ: Automatic Repeat reQest) unused. Consequently, the feedback information used for the ACK/NACK information can be reduced. On the other hand, the MIMO multiplexing mode defined as the prior art requires the feedback information not about the transmission diversity but as the ARQ.

<Transmission Diversity Selecting Unit>

An operational example of the transmission diversity selecting unit 25 will be described. The transmission diversity selecting unit 25 selects the communication procedure used between the transmitter and the receiver on the basis of a magnitude of the timing τ which the time correlation detecting unit 22 has notified of. As the communication procedure, for example, any one of the communication procedures illustrated in FIG. 20 is selected according to the timing τ.

Herein, a method of generating a table shown in FIG. 20 will be explained.

FIG. 22 shows a relation between the magnitude of the timing τ when the time correlation of the received pilot signal decreases and the should-be-applied communication procedure. If the timing τ is smaller than a period of time (an ARQ period) for which to perform the retransmission control (ARQ), the time diversity is suitable. When the two transmitting antennas are provided and if the timing τ is well shorter than symbol time 2T proportional to the number of antennas, the STBC is suitable. When N-pieces, equal to or larger than three pieces, of transmitting antennas are provided and if the timing τ is well shorter than symbol time NT proportional to the number of antennas, the STBC using Quasi-Orthogonal Coding is suitable. Then, when N-pieces, equal to or larger than three pieces, of transmitting antennas are provided and if the timing τ is well shorter than 2NT proportional to a 2-fold antenna count, the STBC using Orthogonal Coding is suitable.

Characteristics of the time diversity as compared with the STBC using the two transmitting antenna are a point that the diversity can be acquired even when the spatial correlation becomes "1" and a point that the diversity can be improved by conducting the transmission a plural number of times with the time width τ. Characteristics of the STBC using the Orthogonal Coding in the case of providing the three transmitting antennas are a point that the diversity is improved in proportion to the transmission antennas and a point that the orthogonalization is complicated enough to require a large number of symbols, resulting in a decrease in throughput. Characteristics of the STBC employing the Quasi-Orthogonal Coding in the case of the three transmitting antennas are a point that the orthogonality is substantially kept when orthogonalized and a point that the diversity is improved in proportion to the transmitting antennas.

As in FIG. 22, the characteristics of the transmission diversity about the magnitude of the timing τ are known. Accordingly, there may be generated a table showing a relation between the range of the value of τ and a type of the transmission diversity that should be selected within this range. The specific relation between the value of τ and the transmission diversity is determined based on a quantity that is arithmetically processible depending on the system together with the characteristics of the transmission diversity. For instance, if the system is durable for a large size of feedback information, finer control can be done in a way that increases the types of feedback bit sequences. Further, if the processing of the time diversity can be executed at a high speed, not the time diversity based on the transmission conducted twice but the time diversity based on the transmission conducted three times is preferable.

<Transmission Diversity Changeover Timing>

Explained is the transmission diversity changeover timing taking account of a propagation path delay and a control delay.

Data of the control delay can be obtained beforehand from the device. Further, as for the propagation path delay, on the occasion of designing a wireless base station, a maximum cell radius is designed from an allowable propagation loss, and a maximum propagation path delay can be obtained from this maximum cell radius. For example, when setting the maximum cell radius to 5 km, the maximum propagation path delay is given from a propagation speed of electromagnetic waves such as $5\times10^3/(3\times10^8)=1.67\times10^{-5}=16.7$ µs, and this becomes the one-way maximum propagation path delay.

The transmission diversity changeover timing in the case of using the system architecture of the transmitting-side wireless communication device illustrated in FIG. 8 and the receiving-side wireless communication device shown in FIG. 10, will be described by way of an example with reference to FIGS. 16-18.

To begin with, a case where a total delay obtained by adding up a maximum propagation path delay a and a control delay b is comparatively short, will be explained. Herein, the delay consists of a transmitting propagation path delay with which the transmitting side transmits the data multiplexed with the pilot signal to the receiving side, a receiver control delay till a feedback bit for selecting the transmission diversity is sent since the propagation path has been estimated and the time correlation has been calculated from the pilot signal on the receiving side, a receiving propagation path delay till the feedback bit is sent to the transmitting side, and a transmitter control delay till the transmission diversity on the transmitting side is changed over since the feedback bit has been determined. The total delay is obtained adding up these delays. Further, the maximum propagation path delay a is determined based on the maximum cell radius. The control delay b is determined based on total time acquired by adding up the time required for the changeover of the communication means of the transmitting-side wireless communication device and the time required for the changeover of the communication means of the receiving-side wireless communication device.

An emphasis is put on a slot built up by combining plural pieces of symbol data and the pilot signal.

Figure 16:
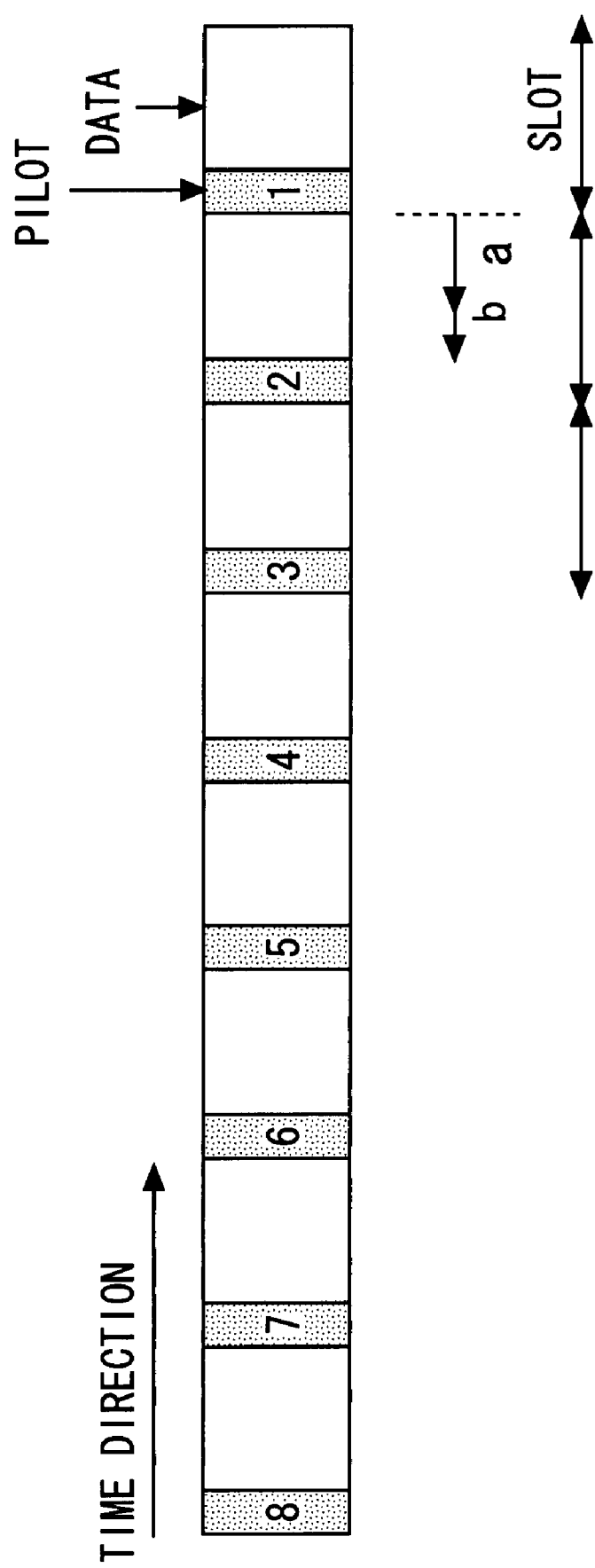
FIG. 16 is an explanatory diagram of a slot control example 1.

FIG. 16 is a conceptual diagram illustrating how the signal is sent along the time base. A time direction in FIG. 16 indicates a direction backdated along the time base. FIG. 16 shows a signal structure in which the pilot signal exists in the latter half of the slot. An assumption in FIG. 16 is that the total delay of the maximum propagation path delay a and the control delay b is shorter than one slot. In this case, the proper transmission diversity can be selected based on the time correlation using up to the pilot signal in the slot 1. Then, the selected transmission diversity can be applied to the slot 3 even when taking the total delay into consideration. In this instance, when receiving the pilot signal of the slot 1 on the receiving side, the transmitting side gets ready for transmitting the slot 2. Accordingly, the feedback bit designating the selected transmission diversity is sent back to the transmitting side, and it does not reach the time of the slot 3 even by making the determination thereof. Such being the case, if a result of the determination is applied from the next slot, a change of the transmission diversity is reflected in the slot 3. The operation proceeds to a data decoding process of the slot 2 during the control delay of the calculation of the time correlation also on the receiving side, and hence the changeover control can be performed at the slot 3 by applying in wait for the next slot.

Figure 17:
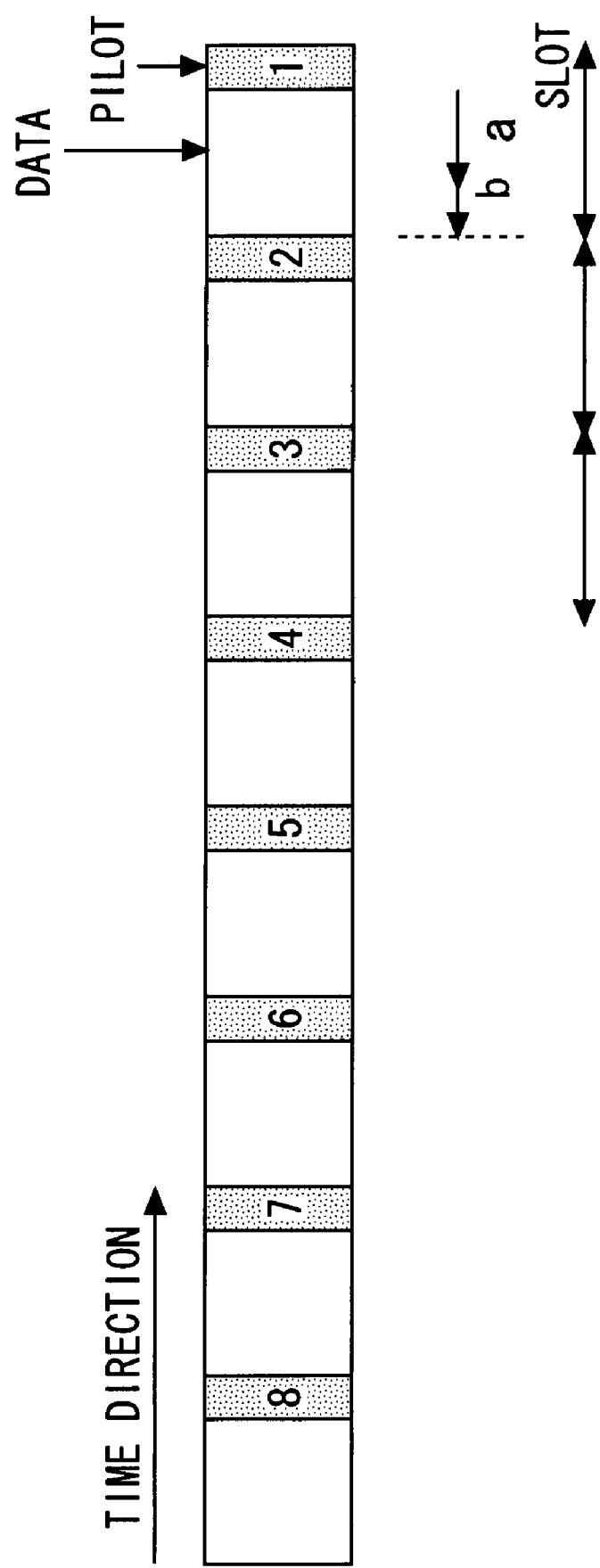
FIG. 17 is an explanatory diagram of a slot control example 2.

FIG. 17 shows a structure in which the pilot signal exists in the first half of the slot. In FIG. 17, the pilot signal exists at the head of the slot, and therefore, if the maximum total delay (the maximum propagation path delay a+the control delay b) is shorter than a data field, the transmission diversity determined by use of the result of the time correlation employing the pilot signals up to the slot 1 can be applied at the slot 2.

Next, a case, in which the total delay time (the maximum propagation path delay a+the control delay b) is longer than one slot, will be explained by exemplifying the slot (a case where the pilot signal exists after the slot) in FIG. 18.

Figure 18:
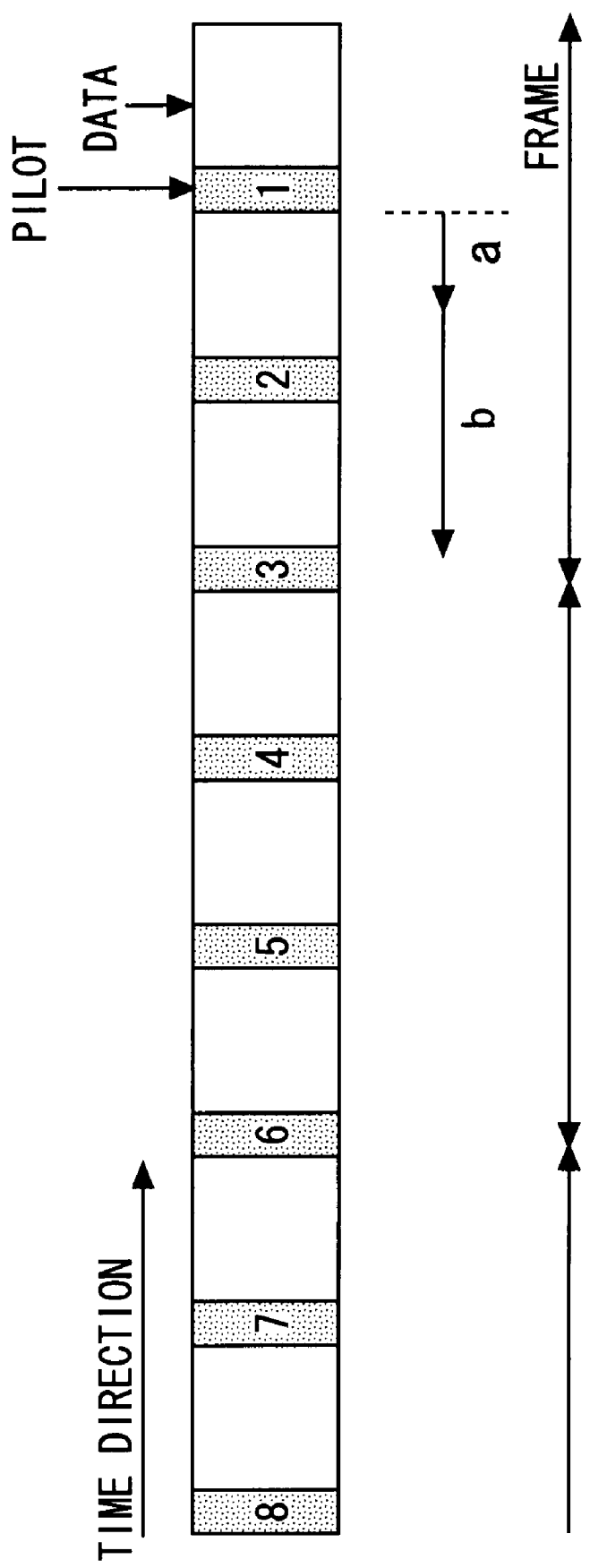
FIG. 18 is an explanatory diagram showing an example of frame control.

FIG. 18 shows that the maximum delay time (a+b) is equal to or larger than one slot but less than two slots. Therefore, this is the case where it is uncertain whether the total delay time becomes one slot or two slots depending on a propagation environment. In this uncertain case, the transmission diversity changeover timing is considered in the framework defined as a frame organized by further combining a plurality of combinations (slots) of the data and the pilot signals.

FIG. 18 shows an example in which one frame is organized by three slots. In this example, the transmission diversity is selected based on the time correlation using the pilot signals up to the first slot of the frame. The thus-selected transmission diversity is applied from the first flow of the next frame. With this scheme, the result of the determination using the pilot signals up to the slot 1 can be reflected at the slot 4 that is the head of the next frame. As described above, the slots and the frame are determined in accordance with the maximum delay time that is preset in the system, whereby the transmission diversity changeover timing control can be realized.

In the manner described, if the maximum delay time is shorter and further longer than in the exemplified case, the transmission diversity changeover control can be executed while restraining an instantaneous break of the wireless communications.

The timing obtained from the control delay of the transmitter and from the propagation delay corresponding to the cell radius is previously incorporated in the system when designing the system, and is designed by the frame that is large enough to be flexible to a variety of wireless base stations and wireless devices.

Under the control described above, the diversity changeover notifying unit 24 changing over the transmission diversity method by synchronizing the timing with the transmitting-side wireless communication device and the diversity decoding unit 21, correspond to [changeover control means conducting changeover to a selected wireless communication procedure] in a receiving-side wireless communication device according to the present invention. On the other hand, under the control described above, the diversity method designating unit 4 changing over the transmission diversity method by synchronizing the timing with the receiving-side wireless communication device and the STBC-or-time diversity encoding unit 5, correspond to [changeover control means conducting changeover to a selected wireless communication procedure] in the transmitting-side wireless communication device according to the present invention.

Five working examples on the occasion of applying the present invention will hereinafter be exemplified.

WORKING EXAMPLES

<Process by Transmitting Unit>

The five working examples of the embodiment of the receiving-side wireless communication device will be described. Before explaining the receiving-side wireless communication device, one working example of the transmitting-side wireless communication device will be described with reference to a processing flowchart shown in FIG. 23.

Note that the demodulation unit 2, the bit determining unit 3, the diversity method designating unit 4 and the STBC-or-time diversity encoding unit 5 illustrated in FIG. 8 can be realized as a program on a CPU (Central Processing Unit) or a DSP (Digital Signal Processor). Part of these components may also be configured by dedicated arithmetic circuits.

The diversity changeover process executed by the transmitting unit in FIG. 8 will be explained with reference to FIG. 23.

Figure 23:
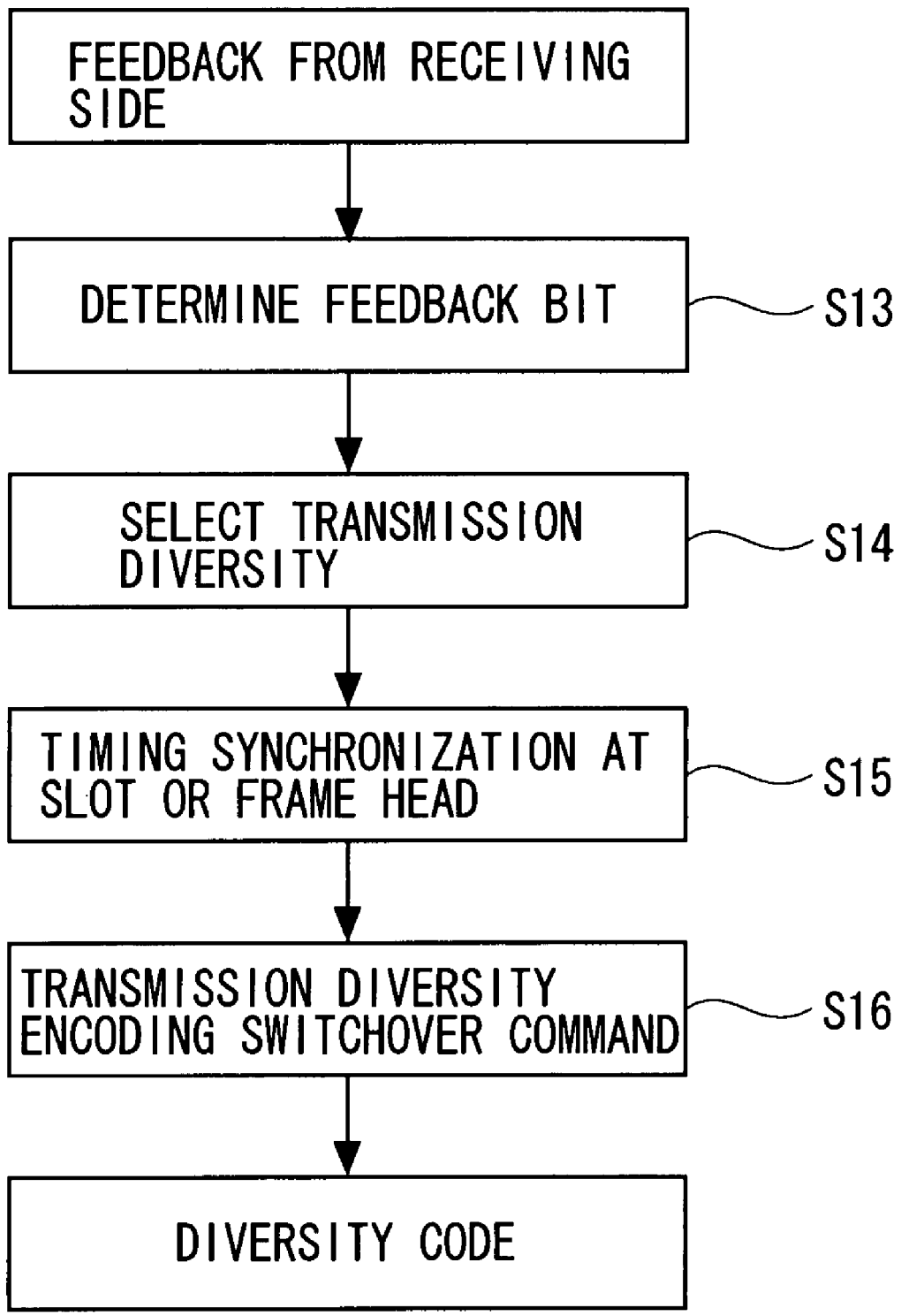
FIG. 23 is a flowchart showing a process of a transmitting unit in a working example.

FIG. 23 is a flowchart of the diversity changeover process by the transmitting unit. In this process, at first, the feedback information received from the partner communication device is demodulated by the demodulation unit 2 and is thereafter sent to the bit determining unit 3. Then, the bit determining unit 3 determines the feedback bit based on the received signal (S13). The diversity method designating unit 4 selects the transmission diversity on the basis of the determined bits (S14). Moreover, the diversity method designating unit 4 synchronizes the timing about the feedback control delay, including the transmission diversity changeover timing in the transmitter and the receiver (S15). For instance, the diversity method designating unit 4, if in the relation between the total delay and the slot as shown in FIG. 16, changes over the transmission diversity at the third slot counter from the slot containing the first pilot signal. Further, as illustrated in FIG. 18, if the total delay is longer than one slot, the diversity method designating unit 4 sets the frame that is sufficiently long for periods of control time on the transmitting and receiving sides. Thus, the transmission diversity method designating unit 4 notifies the STBC-or-time diversity encoding unit 5 of a code changeover instruction of the transmission diversity (S16). Then, the STBC-or-time diversity encoding unit 5 receives the notification about the transmission diversity changeover, and changes over the communication procedure to the notified transmission diversity method. Based on the changed-over transmission diversity method, the STBC-or-time diversity encoding unit 5 encodes the datastream.

Through the steps described above, the transmitting unit is capable of changing over the encoding method of the transmission diversity by synchronizing the timing with the receiving unit.

First Working Example

A first working example corresponds a working example when applying the formula (1) of the system principle in the case of the communication device based on the MISO architecture and a working example when applying the formula (12) of the system principle in the case of the communication device based on the MIMO architecture, respectively.

The first working example of the receiving unit will be described with reference to a flowchart shown in FIG. 11.

It should be noted that the propagation path estimating unit 20, the diversity decoding unit 21, the time correlation detecting unit 22, the diversity changeover notifying unit 24, the transmission diversity selecting unit 25, the feedback bit generating unit 26 and the modulation unit 27 in FIG. 10 can be realized as a program on the CPU (Central Processing Unit) or the DSP (Digital Signal Processor). Part of these components may be, however, built up by dedicated arithmetic circuits.

Figure 11:
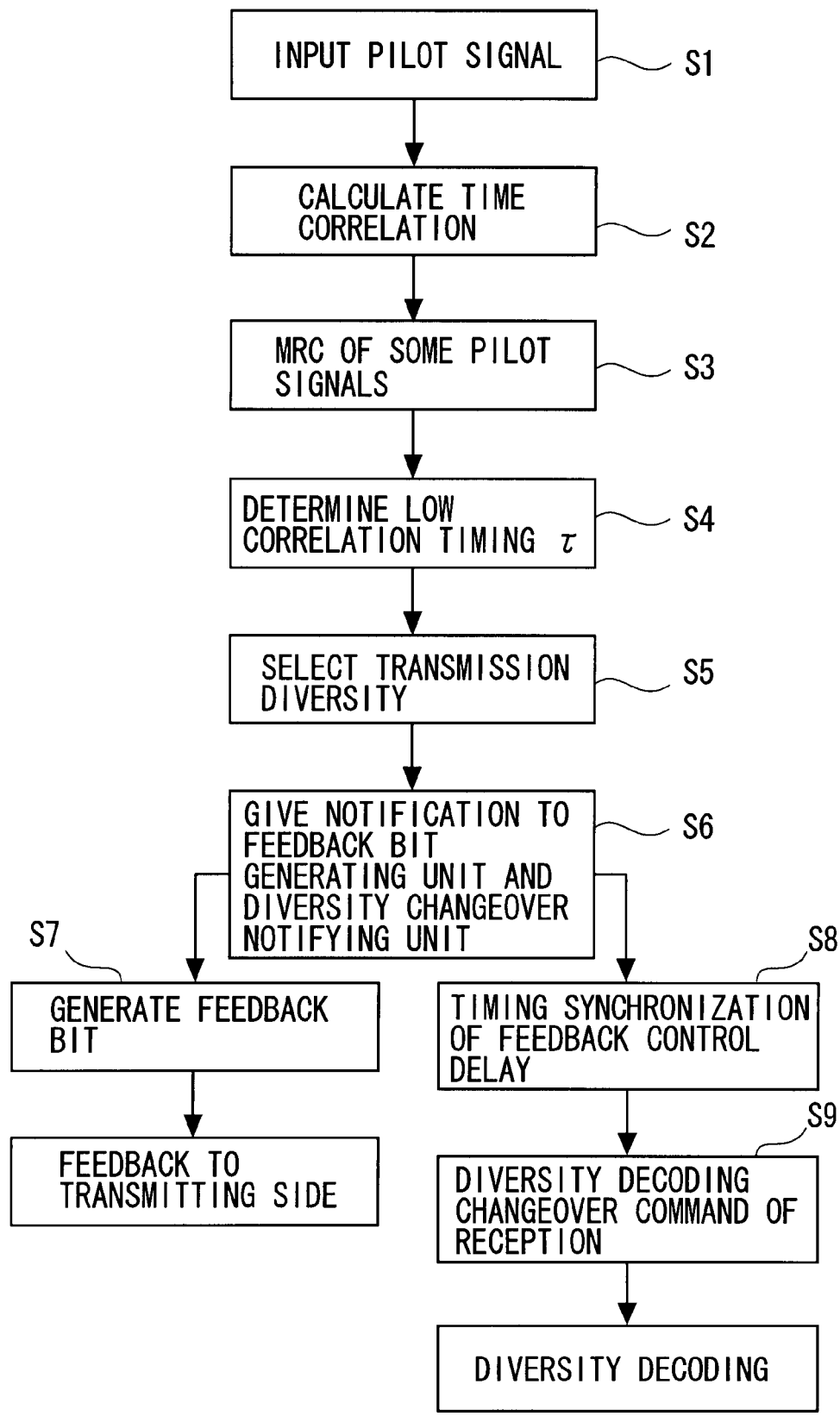
FIG. 11 is a flowchart showing a process of the receiving unit in a first working example.

FIG. 11 is a flowchart of the diversity changeover process by the receiving unit. To start with, the receiving antenna 14 receives the pilot signal from the partner communication device, and transmits the pilot signal to the receiving RF unit 15. The receiving RF unit 15 receives the received signal from the receiving antenna 14 and transmits, after converting the signal into the digital signal, the digital signal to the timing synchronization unit 16. The timing synchronization unit 16, upon receiving the digital signal from the receiving RF unit 15, takes the timing synchronization for the signal processing, and thereafter transmits the signal to the S/P converting unit 17. The S/P converting unit 17 performs the serial-to-parallel conversion of the signal, and thereafter transmits the thus-converted signal to the orthogonal code decoding unit 18 and to the decoding unit 19. Then, the received signal transmitted to the orthogonal code decoding unit 18 is further, after being orthogonal-code-decoded, transmitted to the propagation path estimating unit 20. The propagation path estimating unit 20 estimates the propagation path fluctuation of the received signal (S1). In the case of the MISO architecture, the time correlation detecting unit 22 calculates the time correlation by use of the received signal from an arbitrarily pre-selected transmitting antenna and the reference pilot signal for the received signal. In the case of the MIMO architecture, the time correlation detecting unit 22 calculates the time correlation of the received signal with respect to the arbitrarily pre-selected transmitting antenna and each pair of receiving antennas. The time correlation detecting unit 22 executing this step corresponds to [means calculating a time correlation with one received signal] according to the present invention (S2). In the case of the MISO architecture, the time correlation detecting unit 22 keeps the value of the time correlation obtained in step S2 as it is. In the case of the MIMO architecture, the time correlation detecting unit 22, after calculating an average value of the propagation path fluctuations with respect to the receiving antenna in a predetermined time width, deems a magnitude of the average value of the propagation path fluctuations as a degree of reliability, and performs the maximum ratio combining of the time correlation, thereby obtaining accuracy of the time correlation value (S3). Next, the time correlation detecting unit 22 determines such a time difference and timing τ as to decrease the time correlation from the calculated time correlation value (S4). Subsequently, the transmission diversity selecting unit 25 selects the transmission diversity from the timing τ (S5). Then, the transmission diversity selecting unit 25 notifies the feedback bit generating unit 26 and the diversity changeover notifying unit 24 of the information on the selected transmission diversity (S6). The feedback bit generating unit 26 converts the information on the transmission diversity into a bit format of the bits transmitted as the signals (S7). The bit format in S7 is exemplified in FIG. 20. The signal converted in step S7 is fed back as the feedback information to the transmitting-side wireless communication device by the modulation unit 27. On the other hand, the diversity changeover notifying unit 24 takes the timing synchronization for changing over the transmission diversity method in a way that synchronizes the timing with the transmitting-side wireless communication device with respect to the notified signal (S8). Then, the diversity changeover notifying unit 24, through the timing synchronization in step S8, synchronizes the timing with the transmitting-side wireless communication device, thus changing over the transmission diversity method (S9). The diversity decoding unit 21 decodes the received signal by the changed-over transmission diversity method and extracts the datastream.

Through steps described above, if the accuracies of the received pilot signals of the plurality of radio signals from the plurality of transmitting antennas are estimated substantially the same, the time correlation is calculated and the timing τ is obtained from the received pilot signal from one of those transmitting antennas, then the transmission diversity is selected form the timing τ, and the transmitter is made to notify these items of information as the feedback information. On the other hand, the diversity method of the receiver can be changed over after taking the timing with the transmitter.

Steps S2 and S3 in the first working example are replaced by different steps in second and third working examples.

Second Working Example

A second working example corresponds a working example when applying the formula (9) of the system principle in the case of the communication device based on the MISO architecture and a working example when applying the formula (13) of the system principle in the case of the communication device based on the MIMO architecture, respectively.

Figure 12:
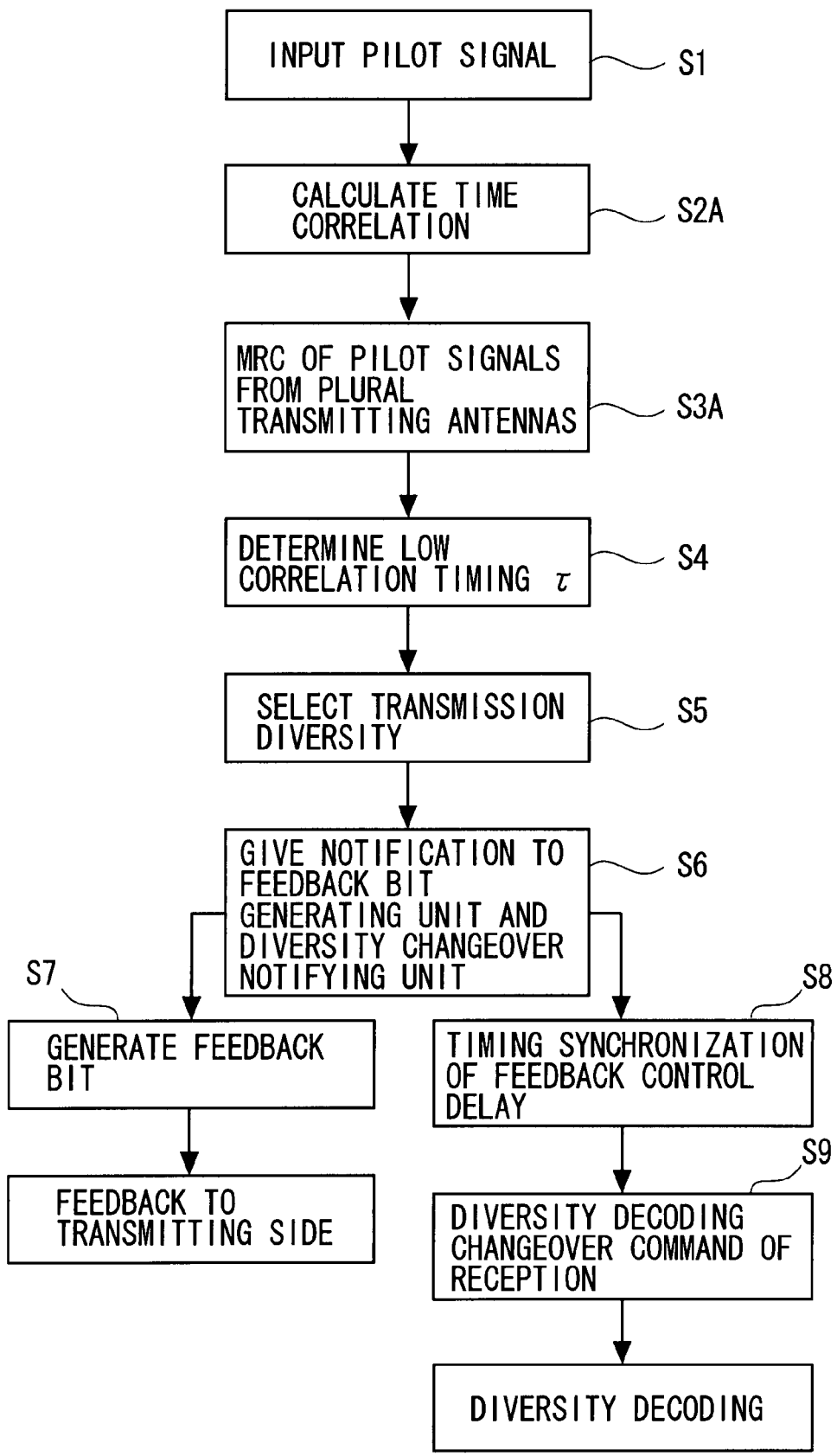
FIG. 12 is a flowchart showing a process of the receiving unit in a second working example.

The second working example will be described with reference to a flowchart, shown in FIG. 12, of the processing by the receiving unit. In FIG. 12, the same processes as those described in the first working example are marked with the same reference symbols as those in FIG. 11, and their explanations are omitted. The second working example is different from the first working example, wherein steps S2 and S3 are replaced by steps S2A and S3A.

The following are processes in steps S2A and S3A. In the case of the MISO architecture, the time correlation detecting unit 22 calculates the time correlations of the received signals from the plurality of transmitting antennas. In the case of the MIMO architecture, the time correlation detecting unit 22 calculates the time correlations of the received signals from the plurality of transmitting antennas with respect to a set of plural receiving antennas. The time correlation detecting unit 22 executing this step corresponds to [means calculating a plurality of time correlations from the plurality of received radio signals] according to the present invention (S2A). In the case of the MISO architecture, the time correlation detecting unit 22, after calculating an average value of the propagation path fluctuations for the plurality of transmitting antennas, performs the maximum ratio combining of the values of the time correlations by use of the average value. In the case of the MIMO architecture, after calculating average values of the propagation path fluctuations for a set of plural transmitting antennas and for a set of plural receiving antennas, conducts the maximum ratio combining of the values of the time correlations by use of the average values. The time correlation detecting unit 22 executing this step corresponds to [means generating a combined time correlation weighted with a magnitude of value of electric power of each of the plural received signals from a plurality of time correlations and from a plurality of received signals] according to the present invention (S3A).

According to this configuration, if the accuracies of the received pilot signals of the radio signals from the plurality of transmitting antennas are different, the time correlation can be calculated with the higher accuracy than by simply averaging the received signals from the plurality of transmitting antennas.

Third Working Example

The third working example corresponds a working example when applying the formula (10) of the system principle in the case of the communication device based on the MISO architecture and a working example when applying the formula (14) of the system principle in the case of the communication device based on the MIMO architecture, respectively.

Figure 13:
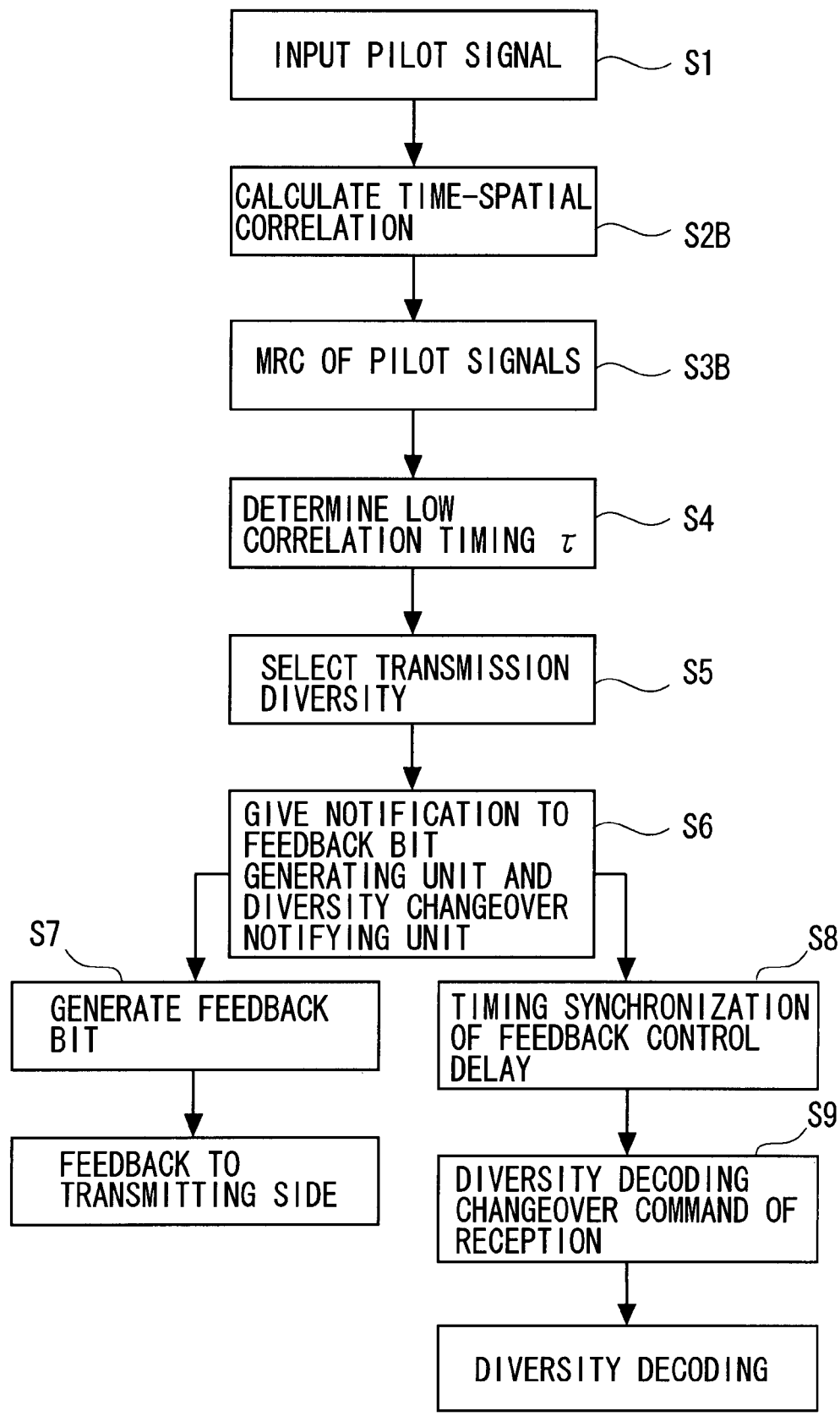
FIG. 13 is a flowchart showing a process of the receiving unit in a third working example.

The third working example will be described with reference to a flowchart, shown in FIG. 13, of the processing by the receiving unit. In FIG. 13, however, the same processes as those described in the first working example are marked with the same reference symbols as those in FIG. 11, and their explanations are omitted. The third working example is different from the first working example, wherein steps S2 and S3 are replaced by steps S2B and S3B.

The following are processes in steps S2B and S3B. In the case of the MISO architecture, the time correlation detecting unit 22 calculates the time correlations of the received signals from the plurality of transmitting antennas. On the occasion of calculating the time correlation, the time correlation is calculated for a set of plural transmitting antennas. In the case of the MIMO architecture, the time correlation detecting unit 22 calculates the time correlations of the received signals from the plurality of transmitting antennas according to every plurality of receiving antennas. Namely, the time correlation detecting unit 22, about each receiving antenna, on the occasion of calculating the time correlation, calculates the time correlation for the set of plural transmitting antennas. Herein, the time correlation detecting unit 22 may also calculate the time correlation for only a set of neighboring transmitting antennas with respect to the plurality of transmitting antennas. The time correlation detecting unit 22 executing this step corresponds to [means calculating a time correlation for a set of plural receiving signals] according to the present invention (S2B). In the case of the MISO architecture, the time correlation detecting unit 22 keeps the time correlation obtained in step S2 as it is. In the case of the MIMO architecture, the time correlation detecting unit 22, after calculating the average value of the propagation path fluctuations for the plurality of receiving antennas, performs the maximum ratio combining of the values of the time correlations obtained according to every plurality of receiving antennas by use of this average value (S3B).

According to this configuration, the time correlation can be calculated by taking account of a spatial interval between the plural transmitting antennas.

Fourth Working Example

Figure 14:
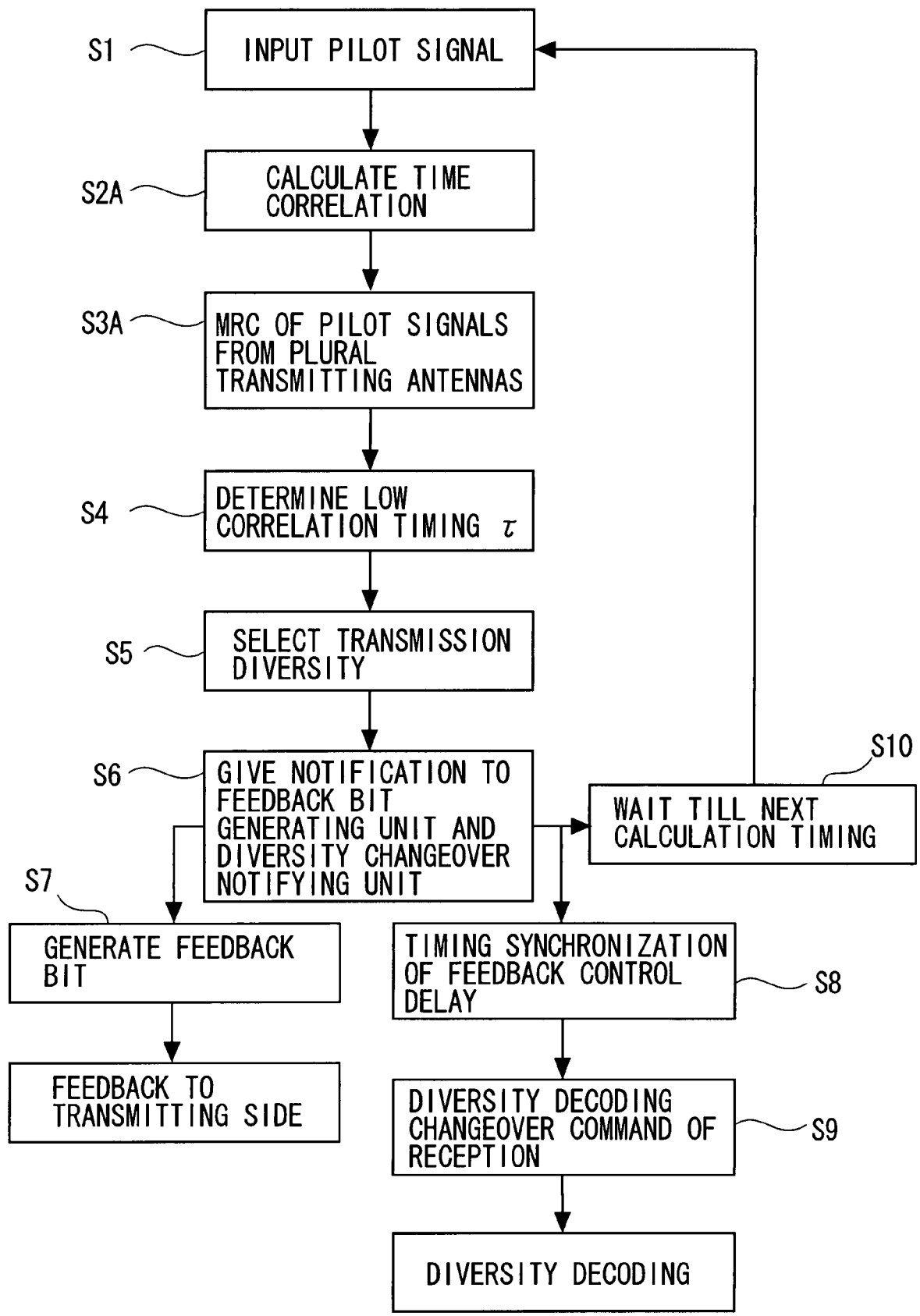
FIG. 14 is a flowchart showing a process of the receiving unit in a fourth working example.

A fourth working example will hereinafter be described with reference to a flowchart, shown in FIG. 14, of the processing by the receiving unit.

The fourth working example is organized by adding step (S10) of waiting till next calculation timing to the second working example. Other processes in the fourth working example are the same as in the case described (FIG. 12) in the second working example. Such being the case, the same processes as those described in the second working example are marked with the same symbols, and their explanations are omitted.

In this configuration, the fourth working example is that the diversity changeover notifying unit 24 notifies the time correlation detecting unit 22 that the arithmetic operation of calculating the time correlation is kept stopping for a short period of time (S10). Then, the time correlation detecting unit 22 measures a period that is preset by the built-in timer according to the notification given from the diversity changeover notifying unit 24, and meanwhile the time correlation is not calculated (the time correlation detecting unit 22 executing this process corresponds to [means measuring a predetermined period of stopping time] according to the present invention).

According to the fourth working example, the arithmetic quantity of calculating the time correlation between the received signals is large, and hence it is feasible to reduce the arithmetic quantity expended in the present system by intermittently executing the arithmetic process in wait for the interval.

It is to be noted that the fourth working example enables, instead of adding step S10 to respective steps in the second working example, step S10 to be added to individual steps in the first working example and also step S10 to be added to respective steps in the second working example.

Fifth Working Example

Figure 15:
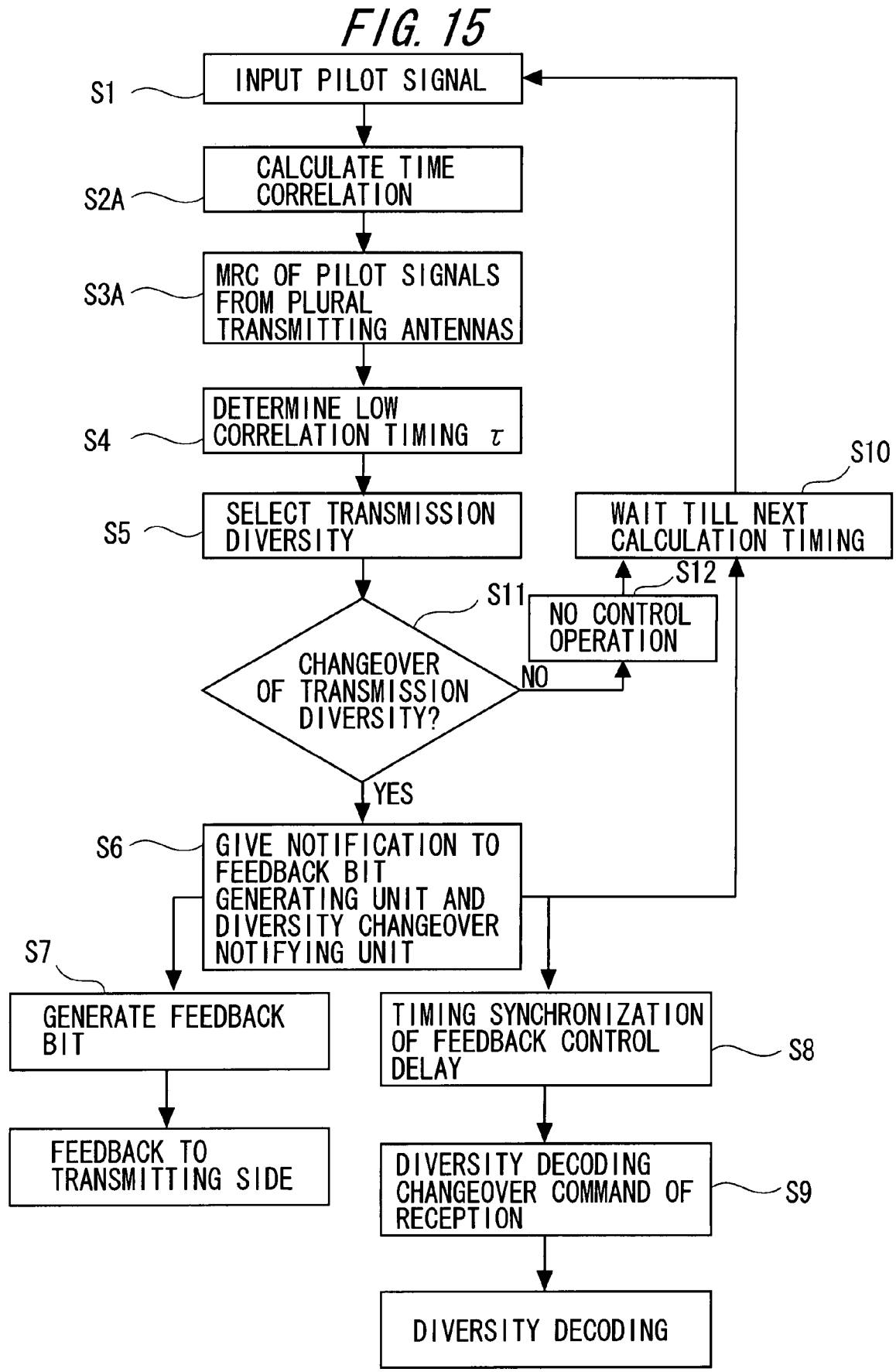
FIG. 15 is a flowchart showing a process of the receiving unit in a fifth working example.

A fifth working example will hereinafter be described with reference to a flowchart, shown in FIG. 15, of the processing by the receiving unit.

The fifth working example adds, to the fourth working example, a step (S11) of determining whether not the transmission diversity is changed over or not and a step (S12) of performing none of changeover control. Other processes in the fifth working example are the same as in the case described (FIG. 12) in the second working example. Then, the same processes as those described in the second working example are marked with the same symbols, and their explanations are omitted.

In the fifth working example, the transmission diversity selecting unit 25 judges, from the timing τ of which the time correlation detecting unit 22 notifies, whether or not the corresponding transmission diversity is of the same method as that of the transmission diversity in use at that point of time. The transmission diversity selecting unit 25 executing this step corresponds to [means determining whether or not the selected communication procedure is the same as the communication procedure in use before the selection] according to the present invention (S11). Then, the transmission diversity selecting unit 25, when determining that the selected transmission diversity is the same as the transmission diversity in use at that point of time, does not notify the feedback bit generating unit 26 of the changeover of the transmission diversity. The transmission diversity selecting unit 25 executing this step corresponds to [means giving no instruction to a partner communication device about the selected communication procedure] according to the present invention. Moreover, at this time, the transmission diversity selecting unit 25 does not notify the diversity changeover notifying unit 24 of the changeover of the transmission diversity. The transmission diversity selecting unit 25 executing this step corresponds to [means changing over none of the communication procedure] according to the present invention (S12).

According to the fifth working example, when the transmission diversity selecting unit 25 selects the same transmission diversity method as that of the transmission diversity in use at that point of time, the transmitting-side wireless communication device and the receiving-side wireless communication device can reduce the arithmetic quantity for the timing synchronization about changing over the transmission diversity.

It is to be noted that the fifth working example can involve using, in place of steps S2A and S3A, steps S2 and S3 in the first working example or steps S2B and S3B in the third working example. In addition, step S10 can be removed while steps S11 and S12 remain intact in the fifth working example.

Modified Examples

Modified Examples of Transmitting-Side communication Device and Receiving-Side Communication Device As discussed above, the embodiment of the present invention has exemplified the case in which the transmitting side is the wireless base station, while the receiving side is the wireless terminal, however, the transmitting side may be the wireless terminal, while the receiving side may be the wireless base station. Further, both of the transmitter and the receiver may also be the wireless terminals or the wireless base stations.

<Application to Propagation Path with Shadowing>

The scheme described above has obtained the time correlation with respect to the fluctuations of fading but can be also applied to shadowing. The fluctuation of the received pilot signal, which is observed for the short period of time, can be deemed as the fluctuation caused by fading. On the other hand, the fluctuation caused by shadowing can be regarded as the fluctuation of the received pilot signal, which is observed for a comparatively long period of time. Accordingly, on the occasion of calculating the time correlation, after carrying out the operation of averaging the received pilot signals for a predetermined time width to such a degree that influence by fading disappears, the time correlation is calculated by use of the received pilot signal after being averaged, whereby the influence by fading can be calculated as a value of the time correlation. Other processes are the same as in the embodiment for fading. Therefore, the wireless procedure effective in shadowing can be changed over.

The scheme described above has focused only the changeover between the time diversity and the STBC, however, another possible scheme is to perform the changeover between the time diversity and SFBC (Space Frequency Block Coding). Further, as apparent from the present embodiment, other communication procedures may also be selected based on a result of calculating the time correlation of the received signal.

<Control Method of Feedback Information by Transmitting Unit>

A configuration for surely transmitting and receiving the feedback information will be explained. Herein, the configuration of the transmitting unit will be described.

FIG. 24 shows a relation between a control method of improving reliability of the feedback bit transmission control and a characteristic thereof. In FIG. 24, error correction coding, the same symbol transmission conducted a plural number of times and bit likelihood determination, and an increase in transmission power are given as selectable techniques for improving the reliability. The respective characteristics of these techniques are given, wherein the control method "the error correction coding" has a characteristic that a slight arithmetic quantity is needed for decoding for error correction, a characteristic that a gain based on coding is extremely large, and a characteristic that a feedback quantity is redundant. The control method "the same symbol transmission conducted a plural number of times and bit likelihood determination" has a characteristic that the arithmetic quantity of the determining method is small, a characteristic that the gain based on the likelihood determination is large, and a characteristic that the feedback information becomes more redundant when acquiring the same gain as by the error correction coding. The control method "the increase in transmission power" has a characteristic that there is no redundancy of the feedback quantity and a characteristic that interference between the users about the feedback information increases. The reliability improving methods given in FIG. 24 respectively have, as illustrated therein, the characteristics, however, the feedback information can be surely transmitted and received by employing combinations of those reliability improving methods and the control methods thereof.

Figure 25:
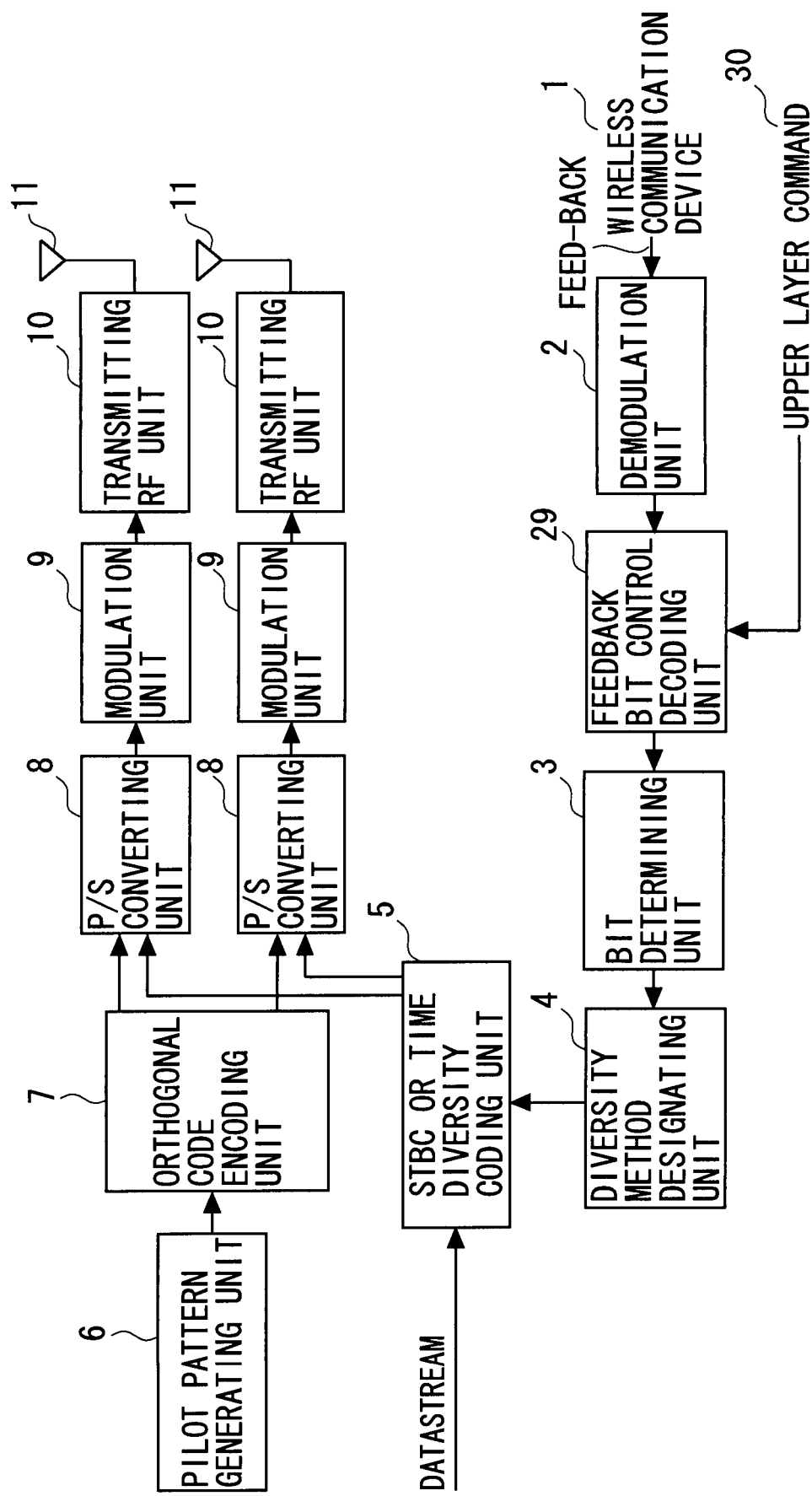
FIG. 25 is a diagram showing a system configuration of the transmitting unit that executes the control based on the feedback bits.

The feedback information reliability improving method by the transmitter will be explained with reference to a bock diagram in FIG. 25. A difference between FIG. 25 and FIG. 8 is that a feedback bit control decoding unit 29 is added to the components in FIG. 8. The feedback bit control decoding unit 29 decodes the feedback bits encoded on the receiver side such as the error correction coding, the transmission of the plural pieces of symbol data and the determination of the bit likelihood. Alternatively, the feedback bit control decoding unit 29 is provided with an interface for accepting a control instruction from a high-order layer 30 that manages the wireless resources for controlling the electric power etc when the receiver side increases the transmission power. Other processes in the present modified example are the same as in the case described (FIG. 8) in <Transmitting Unit 1>. Such being the case, the same processes as those described in <Transmitting Unit 1> are marked with the same symbols, and their explanations are omitted.

When applying the techniques described above, the control delay occurred in the case of using each of the receiving methods is considered when designing the system and is reflected in the changeover timing of the transmitter and the receiver.

<Control Method of Feedback Information by Receiving Unit>

A configuration of transmitting and receiving the feedback information more surely than in the embodiment illustrated in FIG. 10 will be explained. Herein, a configuration of the receiving unit will be described.

As already illustrated in FIG. 24, the transmission control of the feedback bits has the variety of techniques, and the transmission and the reception in the wireless communications can be done more surely than in the configuration illustrated in FIG. 10 by effectively utilizing these techniques.

Figure 26:
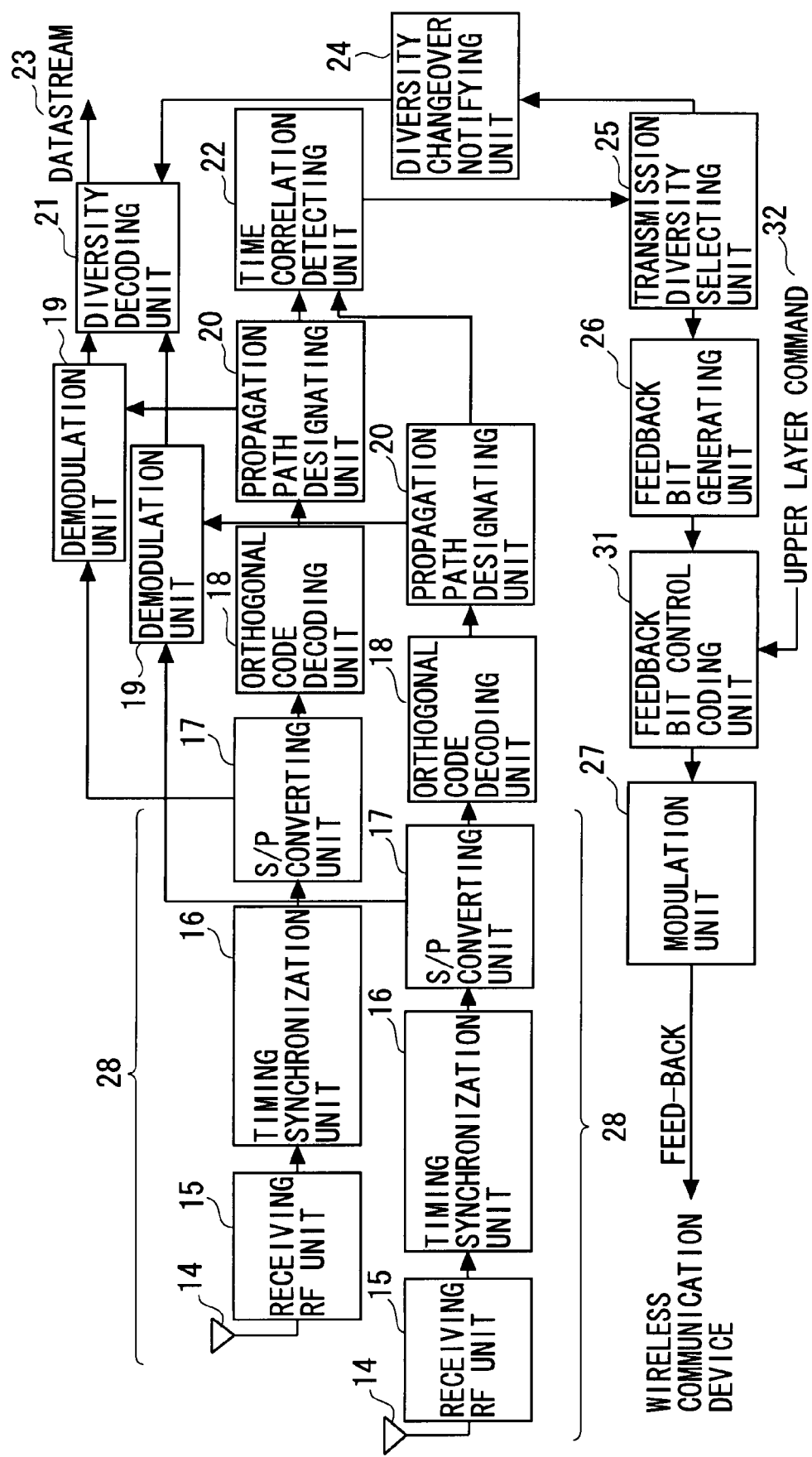
FIG. 26 is a diagram showing a system configuration of the receiving unit that executes the control based on the feedback bits.

A transmission method of the feedback information by the receiver will hereinafter be described with reference to a block diagram in FIG. 26. A difference between FIG. 26 and FIG. 10 is that a feedback bit control decoding unit 31 in FIG. 26 is added to the components in FIG. 10.

The feedback bit control decoding unit 31 decodes the feedback bits decoded on the transmitter side such as the error correction coding, the transmission of the plural pieces of symbol data and the determination of the bit likelihood. Alternatively, the feedback bit control decoding unit 31 is provided with an interface for accepting a control instruction from a high-order layer 32 that manages the wireless resources for controlling the electric power etc in order to increase the transmission power. Other processes in the present modified example are the same as in the case described (FIG. 10) in <Receiving Unit>. Such being the case, the same processes as those described in <Receiving Unit> are marked with the same symbols, and their explanations are omitted.

When utilizing the reliability improving techniques described above, the control delay occurred in the case of using each of the receiving methods is considered when designing the system and is reflected in the changeover timing of the transmitter and the receiver.

<Incorporation by Reference>

The disclosures of international application PCT/JP2005/004570 filed on Mar. 15, 2005 including the specification, drawings and abstract are incorporated herein by reference.

What is claimed is:

1. A communication device comprising:
   a receiving unit receiving radio signals from a partner communication device;
   a storing unit storing signals received for a predetermined period;
   a calculating unit calculating a time correlation defined as a correlation between the received signal received from a first reference point of time onward within the predetermined period and the received signal received from a second reference point of time onward within the predetermined period;
   an obtaining unit obtaining a time difference between the first reference point of time and the second reference point of time when the time correlation takes a value of a predetermined range, which indicates a desired retransmission interval;
   a selecting unit selecting an encoding method of transmission diversity corresponding to the time difference; and
   an instructing unit instructing said partner communication device about the selected encoding method.

2. A communication device according to claim 1, wherein the calculating unit calculating the time correlation with one received signal of a plurality of radio signals received from said partner communication device.

3. A communication device according to claim 1, wherein the calculating unit calculating the time correlation with respect to a combination of plural received signals from a plurality of radio signals received from said partner communication device.

4. A communication device according to claim 1, wherein said instructing unit instructing said partner communication device about the selected encoding method gives the instruction in a way that associates the selected encoding method with a bit sequence to be fed back.

5. A communication device according to claim 1,
   wherein the selecting unit selecting an encoding method from orthogonal space-time/space-frequency block coding or retransmit diversity corresponding to the time difference.

6. A communication device comprising:
   a receiving unit receiving radio signals from a partner communication device;
   a storing unit storing signals received for a predetermined period;
   a calculating unit calculating a time correlation defined as a correlation between the received signal received from a first reference point of time onward within the predetermined period and the received signal received from a second reference point of time onward within the predetermined period;
   an obtaining unit obtaining a time difference between the first reference point of time and the second reference point of time when the time correlation takes a value of a predetermined range;
   a selecting unit selecting an encoding method of transmission diversity corresponding to the time difference; and an instructing unit instructing said partner communication device about the selected encoding method,
wherein the calculating unit calculating a plurality of time correlations from a plurality of radio signals received from said partner communication device; and further comprising a generating unit generating a combined time correlation weighted with a magnitude of a value of electric power of each of the plural received signals, from the plurality of time correlations and the plurality of received signals.

7. A communication device comprising:
a receiving unit receiving radio signals from a partner communication device;
a storing unit storing signals received for a predetermined period;
a calculating unit calculating a time correlation defined as a correlation between the received signal received from a first reference point of time onward within the predetermined period and the received signal received from a second reference point of time onward within the predetermined period;
an obtaining unit obtaining a time difference between the first reference point of time and the second reference point of time when the time correlation takes a value of a predetermined range;
a selecting unit selecting an encoding method of transmission diversity corresponding to the time difference;
an instructing unit instructing said partner communication device about the selected encoding method; and
a determining unit determining whether or not an encoding method selected by said selecting unit is the same as an encoding method used before the selection, wherein said instructing unit further includes, if the pre-selection encoding method is the same as the post-selection encoding method, said partner communication device is not instructed about the selected encoding method.

8. A communication device comprising:
a receiving unit receiving radio signals from a partner communication device:
a storing unit storing signals received for a predetermined period;
a calculating unit calculating a time correlation defined as a correlation between the received signal received from a first reference point of time onward within the predetermined period and the received signal received from a second reference point of time onward within the predetermined period;
an obtaining unit obtaining a time difference between the first reference point of time and the second reference point of time when the time correlation takes a value of a predetermined range;
a selecting unit selecting an encoding method of transmission diversity corresponding to the time difference;
an instructing unit instructing said partner communication device about the selected encoding method;
a unit measuring a predetermined period of stopping time when selecting the encoding method;
a unit stopping the calculation of the time correlation during the period of stopping time; and
a unit resuming the process of calculating the time correlation after the period of stopping time.

9. A communication device comprising:
a receiving unit receiving radio signals from a partner communication device;
a storing unit storing signals received for a predetermined period;
a calculating unit calculating a time correlation defined as a correlation between the received signal received from a first reference point of time onward within the predetermined period and the received signal received from a second reference point of time onward within the predetermined period;
an obtaining unit obtaining a time difference between the first reference point of time and the second reference point of time when the time correlation takes a value of a predetermined range;
a selecting unit selecting an encoding method of transmission diversity corresponding to the time difference;
an instructing unit instructing said partner communication device about the selected encoding method; and
a changeover control unit changing over an encoding method in said receiving unit to the selected encoding method after an elapse of a predetermined period of time since the encoding method has been selected.

10. A communication device according to claim 9, further comprising: a determining unit determining whether or not the encoding method selected by said selecting unit is the same as the encoding method used before the selection; and the changeover control unit changing over, if the pre-selection encoding method is the same as the post-selection encoding method, none of the communication procedure.

11. A communication method comprising:
receiving radio signals from a partner communication device, the received signals received for a predetermined period;
calculating a time correlation defined as a correlation between a received signal received from a first reference point of time onward within the predetermined period and a received signal received from a second reference point of time onward within the predetermined period;
obtaining a time difference between the first reference point of time and the second reference point of time when the time correlation takes a value of a predetermined range, which indicates a desired retransmission interval;
selecting an encoding method of transmission diversity corresponding to the time difference; and
instructing said partner communication device about the selected encoding method.

12. A communication method according to claim 11, further comprising: calculating the time correlation with one received signal of a plurality of radio signals received from said partner communication device.

13. A communication method according to claim 11, further comprising: calculating the time correlation with respect to a combination of plural received signals from a plurality of radio signals received from said partner communication device.

14. A communication method according to claim 11, wherein said instructing said partner communication device about the selected encoding method includes giving the instruction in a way that associates the selected encoding method with a bit sequence to be fed back.

15. A communication method according to claim 11,
wherein the selecting unit selecting an encoding method from orthogonal space-time/space-frequency block coding or retransmit diversity corresponding to the time difference.

16. A communication method comprising:
receiving radio signals from a partner communication device, the received signals received for a predetermined period;

calculating a time correlation defined as a correlation between a received signal received from a first reference point of time onward within the predetermined period and a received signal received from a second reference point of time onward within the predetermined period;

obtaining a time difference between the first reference point of time and the second reference point of time when the time correlation takes a value of a predetermined range;

selecting an encoding method of transmission diversity corresponding to the time difference;

instructing said partner communication device about the selected encoding method;

calculating a plurality of time correlations from a plurality of radio signals received from said partner communication device; and generating a combined time correlation weighted with a magnitude of a value of electric power of each of the plural received signals, from the plurality of time correlations and the plurality of received signals.

17. A communication method comprising:

receiving radio signals from a partner communication device, the received signals received for a predetermined period;

calculating a time correlation defined as a correlation between a received signal received from a first reference point of time onward within the predetermined period and a received signal received from a second reference point of time onward within the predetermined period;

obtaining a time difference between the first reference point of time and the second reference point of time when the time correlation takes a value of a predetermined range;

selecting an encoding method of transmission diversity corresponding to the time difference;

instructing said partner communication device about the selected encoding method; and determining whether or not the encoding method selected in said selecting is the same as an encoding method used before the selection, wherein said instructing of instructing said partner communication device includes, if the pre-selection encoding method is the same as the post-selection encoding method, not instructing said partner communication device about the selected encoding method.

18. A communication method comprising:

receiving radio signals from a partner communication device, the received signals received for a predetermined period;

calculating a time correlation defined as a correlation between a received signal received from a first reference point of time onward within the predetermined period and a received signal received from a second reference point of time onward within the predetermined period;

obtaining a time difference between the first reference point of time and the second reference point of time when the time correlation takes a value of a predetermined range;

selecting an encoding method of transmission diversity corresponding to the time difference;

instructing said partner communication device about the selected encoding method;

measuring a predetermined period of stopping time when selecting the encoding method;

stopping the calculation of the time correlation during the period of stopping time; and resuming the process of calculating the time correlation after the period of stopping time.

19. A communication method comprising:

receiving radio signals from a partner communication device, the received signals received for a predetermined period;

calculating a time correlation defined as a correlation between a received signal received from a first reference point of time onward within the predetermined period and a received signal received from a second reference point of time onward within the predetermined period;

obtaining a time difference between the first reference point of time and the second reference point of time when the time correlation takes a value of a predetermined range;

selecting an encoding method of transmission diversity corresponding to the time difference;

instructing said partner communication device about the selected encoding method; and changing over a receiving encoding method in said receiving of the radio signals from said partner communication device to the selected encoding method after an elapse of a predetermined period of time since the encoding method has been selected.

20. A communication method according to claim 19, further comprising: determining whether or not the encoding method selected in said encoding method selecting is the same as an encoding method used before the selection; and changing over, if the pre-selection encoding method is the same as the post-selection encoding method, none of the encoding method.

* * * * *